United States Patent
Lee et al.

(10) Patent No.: US 12,373,222 B2
(45) Date of Patent: **\*Jul. 29, 2025**

(54) ACTIVATING NEW DEVICE BASED ON CONTAINER IN VEHICLE

(71) Applicant: LG Electronics Inc., Seoul (KR)

(72) Inventors: Chulhee Lee, Seoul (KR); Namyong Park, Seoul (KR); Dongkyu Lee, Seoul (KR); Woosung Kim, Seoul (KR); Eunkoo Lee, Seoul (KR); Taesuk Yoon, Seoul (KR); Hyunkyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,073

(22) Filed: Mar. 4, 2024

(65) Prior Publication Data

US 2024/0248730 A1    Jul. 25, 2024

Related U.S. Application Data

(63) Continuation of application No. 17/075,891, filed on Oct. 21, 2020, now Pat. No. 11,972,268.

(Continued)

(30) Foreign Application Priority Data

Jun. 30, 2020   (WO) ................ PCT/KR2020/008540

(51) Int. Cl.
| | |
|---|---|
| *G06F 8/65* | (2018.01) |
| *G06F 8/41* | (2018.01) |
| *G06F 8/61* | (2018.01) |
| *G06F 8/71* | (2018.01) |
| *G06F 9/445* | (2018.01) |

(Continued)

(52) U.S. Cl.
CPC .............. *G06F 9/445* (2013.01); *G06F 8/433* (2013.01); *G06F 8/61* (2013.01); *G06F 8/65* (2013.01); *G06F 8/71* (2013.01)

(58) Field of Classification Search
CPC .. G06F 3/04817; G06F 16/185; G06F 3/0482; G06F 9/5016; G06F 21/53; G06F 21/44; G06F 3/01; G06F 8/433; G06F 8/61; G06F 8/63; G06F 8/65; G06F 8/71; G06F 9/4401; G06F 9/4411; G06F 9/445; G06F 9/455; G06F 9/54; G06F 9/468; G06F 8/36; B60R 16/02; G06Q 50/40; H04L 65/04;

(Continued)

(56) References Cited

U.S. PATENT DOCUMENTS

| | | | |
|---|---|---|---|
| 7,793,136 B2 * | 9/2010 | Lutter ..................... | G06F 9/468 714/1 |
| 11,601,303 B1 * | 3/2023 | Schwaiger ........ | H04L 12/40078 |
| 11,820,326 B2 * | 11/2023 | Drayna ................... | H04W 4/80 |

* cited by examiner

*Primary Examiner* — Thuy Dao
(74) *Attorney, Agent, or Firm* — Fish & Richardson P.C.

(57) ABSTRACT

A method of activating a new device in a vehicle based on a container includes: detecting the new device mounted in the vehicle using an interface implemented in the vehicle, identifying the detected new device, transmitting, to a server, (i) a request for a container for controlling an execution of the identified new device and (ii) information obtained by one or more sensors implemented in the vehicle, receiving, from the server, a container package including at least one container that is retrieved in the server in response to the request for the container, and controlling the execution of the new device by activating the at least one container.

18 Claims, 22 Drawing Sheets

Related U.S. Application Data

(60) Provisional application No. 62/935,654, filed on Nov. 15, 2019.

(51) Int. Cl.
*G06F 16/21* (2019.01)
*G06F 21/55* (2013.01)
*H04L 12/40* (2006.01)

(58) Field of Classification Search
CPC ............... H04L 63/10; H04L 12/40078; H04L 12/40071; H04L 12/40; G01S 19/37
See application file for complete search history.

ACTIVATING NEW DEVICE BASED ON CONTAINER IN VEHICLE

CROSS-REFERENCE TO RELATED APPLICATIONS

The present application is a continuation of U.S. application Ser. No. 17/075,891, filed on Oct. 21, 2020, which claims the benefit of an earlier filing date and right of priority to U.S. Provisional Application No. 62/935,654, filed on Nov. 15, 2019, and the present application claims the benefit of an earlier filing date and right of priority to International Application No. PCT/KR2020/008540, filed on Jun. 30, 2020, the contents of which are hereby incorporated by reference in their entirety.

BACKGROUND OF THE DISCLOSURE

Field of the Disclosure

This disclosure relates to a method of activating a new device based on data-centered architecture in a vehicle.

Related Art

In general, a conventional head-up display (HUD) plays a role as an assistant display for secondary information which is already available in another region within a vehicle part. Graphics are basically inevitably static, and do not interact with the real world from a viewpoint of a driver. Examples of secondary information displayed on the conventional HUD may include a speed meter, a search signal, etc., which are information also provided to the cluster or center stack of a vehicle.

Furthermore, in the conventional HUD, a method of displaying information using a small FOV and the amount of a real object with which a HUD symbol may interact are inevitably limited. Furthermore, a short binocular interpapillary distance (BID) does not support the overlay of graphics on a real object due to a method of recognizing a distance with the naked eye. Furthermore, the conventional HUD does not generate a real-time human interface (HMI) that interacts with the field of view (FOV) of a driver using vehicle sensor data.

Accordingly, a device performing an augmented reality head-up display (AR HUD) function may be applied to a vehicle. To this end, the vehicle may have a front camera additionally mounted thereon, and may perform the AR HUD function normally by processing a front camera image in real time. However, in the state in which a device performing the conventional HUD function has been mounted in a vehicle, a device performing the AR HUD function may be newly installed in the vehicle.

In this case, when the new device is added, the vehicle must collect vehicle sensor data through a direct connection with an interface within the vehicle. Data collection is performed only through a conventional known vehicle network interface.

Furthermore, if an operation is performed through direct access to a network within the vehicle, stability is inevitably degraded. In the case of a new device, there is a problem in that an authority setting problem related to a data use must be solved.

SUMMARY OF THE DISCLOSURE

This disclosure is to solve the aforementioned needs and/or problems.

Furthermore, the present disclosure provides a method of activating a new device based on a container in a vehicle upon association with real-time sensor data of the vehicle for a function implementation of a new device based on a data-centered architecture based on a container.

Furthermore, the present disclosure provides a method of activating a new device based on a container in a vehicle using a more convenient method in such a way to search for a finally available container by collecting information provided by a vehicle on a cloud and information which may be provided through the new device, without using a vehicle-dedicated network.

Furthermore, the present disclosure provides a method of activating a new device based on a container in a vehicle, wherein an update pattern of a container is differently applied by considering association between a new device and the existing device.

A method of activating a new device based on a container in a vehicle according to an aspect of the present disclosure includes detecting that the new device is mounted in the vehicle, identifying the detected new device and requesting, from a server, the container for controlling an execution of the new device in the vehicle, receiving, from the server, a container package including at least one container retrieved in the server in response to the request for the container, and controlling the execution of the new device by activating the at least one container.

Requesting the container may include transmitting, to the server, information which may be provided by the vehicle and information of the new device.

The information which may be provided by the vehicle may include at least one vehicle sensing data, and the vehicle sensing data may be collected over at least one vehicle network and stored in a vehicle data repository.

The information of the new device may include at least one piece of function information provided from the new device to the vehicle.

Requesting the container may further include receiving, from the server, information of a container corresponding to the new device in response to the request, checking whether a container included in the received information of the container is operable in a system of the vehicle, and displaying the operable at least one container on a display of the vehicle.

The method of activating a new device based on a container in a vehicle may further include downloading a selected container from the server when at least one of the operable at least one container is selected, performing dependency check on the downloaded container, and installing the downloaded container when the dependency check is satisfied.

The dependency check may include determining whether an omission of at least one container essentially necessary for the execution of the new device is present in the container package, and receiving a completed container package from the server through a request from the server if the omission is present.

The method of activating a new device based on a container in a vehicle may further include updating a list of containers based on a version update of a container previously installed on the vehicle, a replacement of the previously installed container, or whether a new part has been added to the previously installed container, if at least one of the operable at least one container is not selected.

Identifying the new device may include checking whether the detected new device is present in a vehicle device repository or the server, and determining the new device as a non-supported device if the new device is determined to be not present in the vehicle device repository and the server.

If the new device is determined as the non-supported device, the method may further include transmitting information of the new device and identification error information to the server and identifying the new device based on the new device registered with the server and a container corresponding to the new device.

The new device may be an AR-HUD. The information of the new device may include at least one of a speed, object recognition and identification function, and road recognition and identification function of the vehicle, a distance between objects, whether an object is present in each road line, a current location of the vehicle, current and next road environments, a destination location, or a passing-possible line.

The new device may be an air cleaner. The information of the new device may include at least one of a fan speed of the air cleaner, PM 10 fine dust concentrations, PM 2.5 fine dust concentrations, a carbon dioxide concentration or a degree of filter contamination.

The new device may be a driver monitoring system (DMS). The information of the new device may include a function for detecting at least sleepiness information, eye tracking, a head direction, a movement of lips, an expression, an emotion or face recognition of a driver.

A vehicle system according to another aspect of the present disclosure includes an interface detecting a connection to a device, a vehicle data repository obtaining at least one vehicle sensing data, a container repository storing a container including at least one program, data and system library for controlling an execution of the external device, and a processor functionally coupled to the vehicle data repository and the container repository and configured to control an execution of the container, wherein the processor may be configured to identify a detected new device when a connection to the new device is detected through the interface and request, from a server, a container for controlling an execution of the new device within a vehicle, receive, from the server, a container package including at least one container retrieved in the server in response to the request for the container, and control the execution of the new device by activating the at least one container.

The processor may be configured to request the container from the server based on information which may be provided by the vehicle and information of the new device.

The information which may be provided by the vehicle may include the at least one vehicle sensing data. The vehicle sensing data may be collected over at least one vehicle network and stored in the vehicle data repository.

The information of the new device may include at least one function information provided from the new device to the vehicle.

The processor may be configured to receive, from the server, information of a container corresponding to the new device in response to the request, check whether a container included in the received information of the container is operable in a system of the vehicle, and display the operable at least one container on a display of the vehicle.

The processor may be configured to download a selected container from the server when at least one of the operable at least one container is selected, perform dependency check on the downloaded container, and install the downloaded container when the dependency check is satisfied.

The processor may be configured to determine whether an omission of at least one container essentially necessary for the execution of the new device is present in the container package, and receive a completed container package from the server through a request from the server if the omission is present.

If at least one of the operable at least one container is not selected, the processor may update a list of containers based on a version update of a container previously installed on the vehicle, a replacement of the previously installed container, and whether a new part has been added to the previously installed container.

The processor may determine whether the detected new device is present in the vehicle device repository or the server. If it is determined that the new device is not present in the vehicle device repository and the server, the processor may determine the new device as a non-supported device.

If the new device is determined as the non-supported device, the processor may transmit information of the new device and identification error information to the server, and may identify the new device based on the new device registered with the server and a container corresponding to the new device.

According to an embodiment of the present disclosure, real-time sensor data of a vehicle can be associated for a function implementation of a new device based on a data-centered architecture based on a container.

Furthermore, according to an embodiment of the present disclosure, a new device based on a container can be activated in a vehicle using a more convenient method by collecting information which may be provided by the vehicle and information which may be provided through the new device on the cloud, without using a vehicle-dedicated network, and searching for a finally available container.

Furthermore, according to an embodiment of the present disclosure, a new device activation method can be applied more conveniently by differently applying an update pattern of a container in consideration of association between a new device and the existing device.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Driving (1) Exterior of Vehicle

Figure 1:
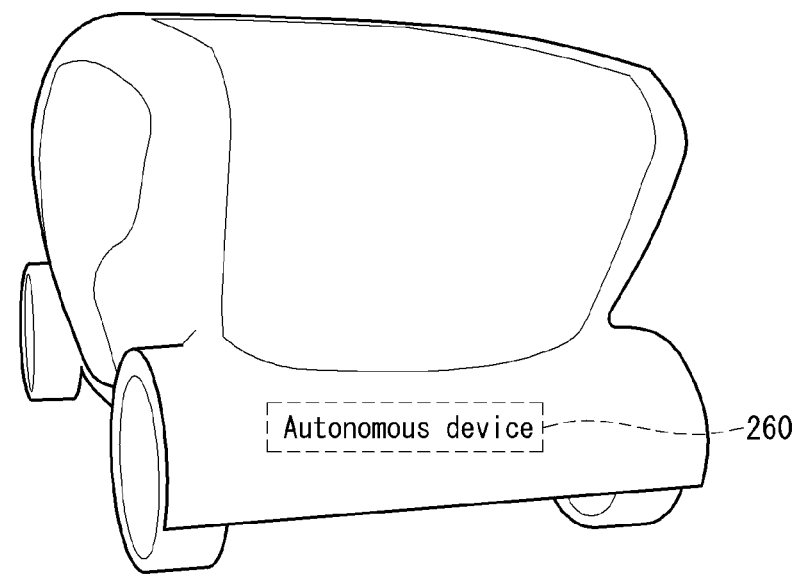
FIG. 1 illustrates a vehicle according to an embodiment of the present disclosure.
Figure 1:
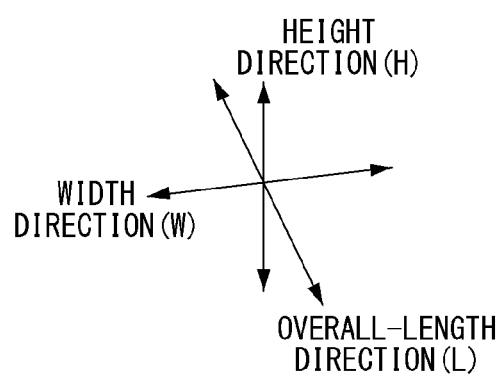

FIG. 1 is a diagram showing a vehicle according to an embodiment of the present disclosure.

Referring to FIG. 1, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 2:
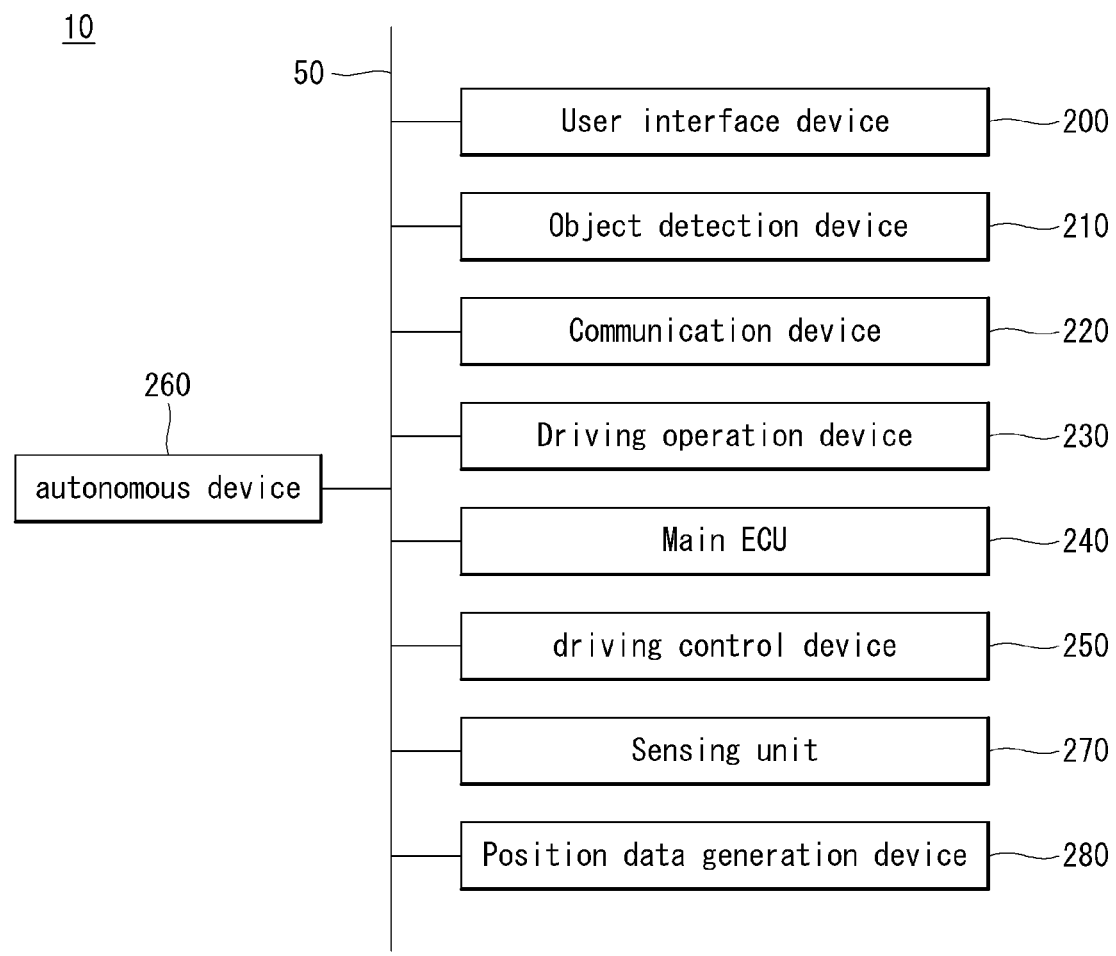
FIG. 2 is a control block diagram of the vehicle according to an embodiment of the present disclosure.

FIG. 2 is a control block diagram of the vehicle according to an embodiment of the present disclosure.

Referring to FIG. 2, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

Figure 3:
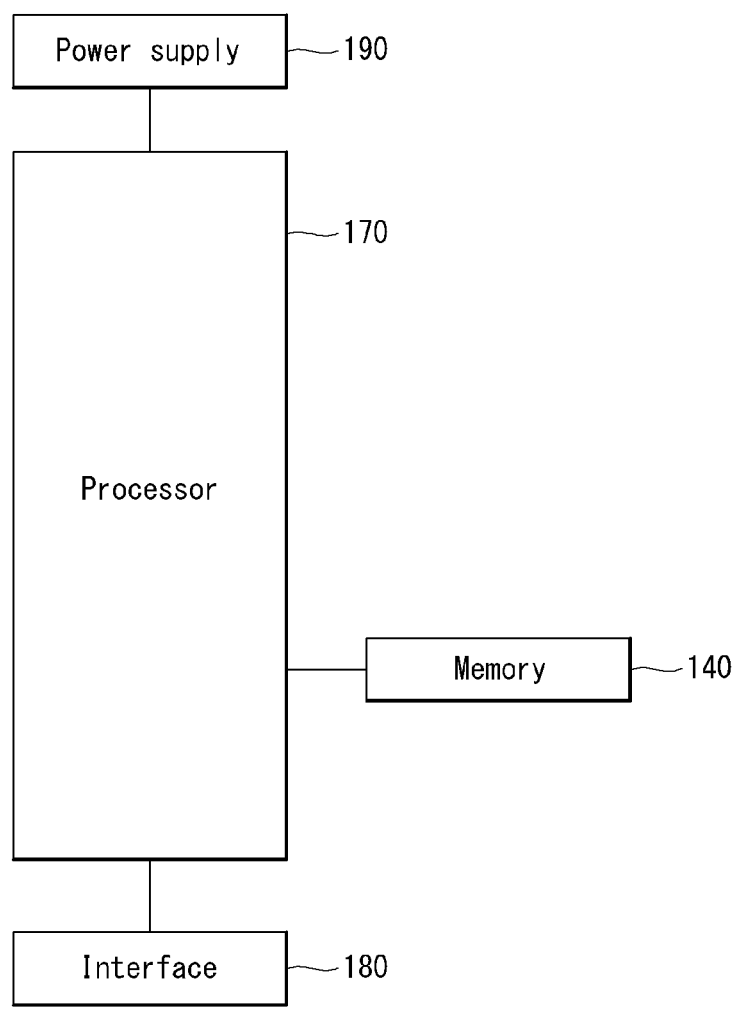
FIG. 3 is a control block diagram of an autonomous device according to an embodiment of the present disclosure.

FIG. 3 is a control block diagram of the autonomous device according to an embodiment of the present disclosure.

Referring to FIG. 3, the autonomous device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190.

The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

Figure 4:
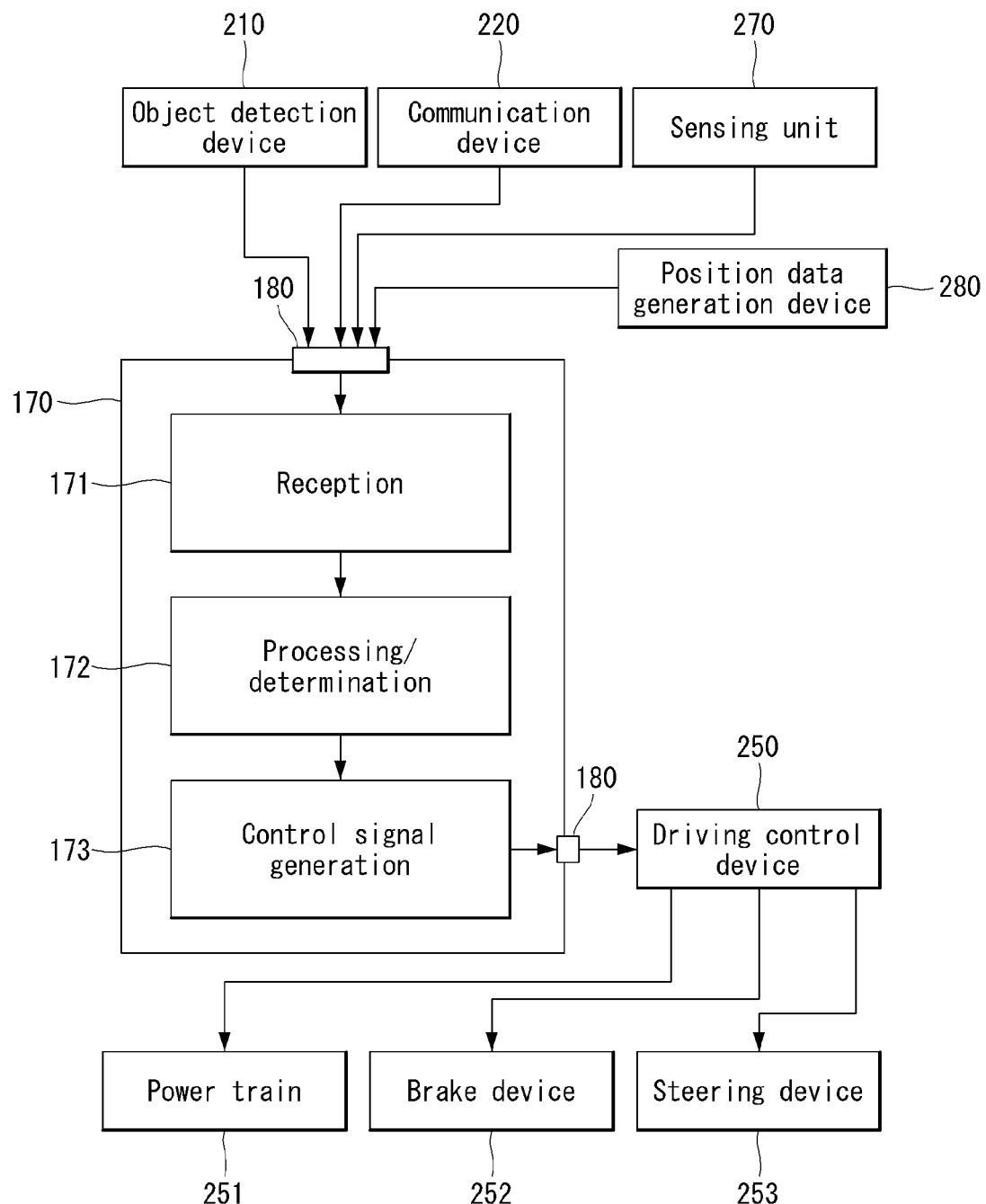
FIG. 4 is a diagram showing a signal flow in an autonomous vehicle according to an embodiment of the present disclosure.

FIG. 4 is a diagram showing a signal flow in an autonomous vehicle according to an embodiment of the present disclosure.

1) Reception Operation

Referring to FIG. 4, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

Cabin

Figure 5:
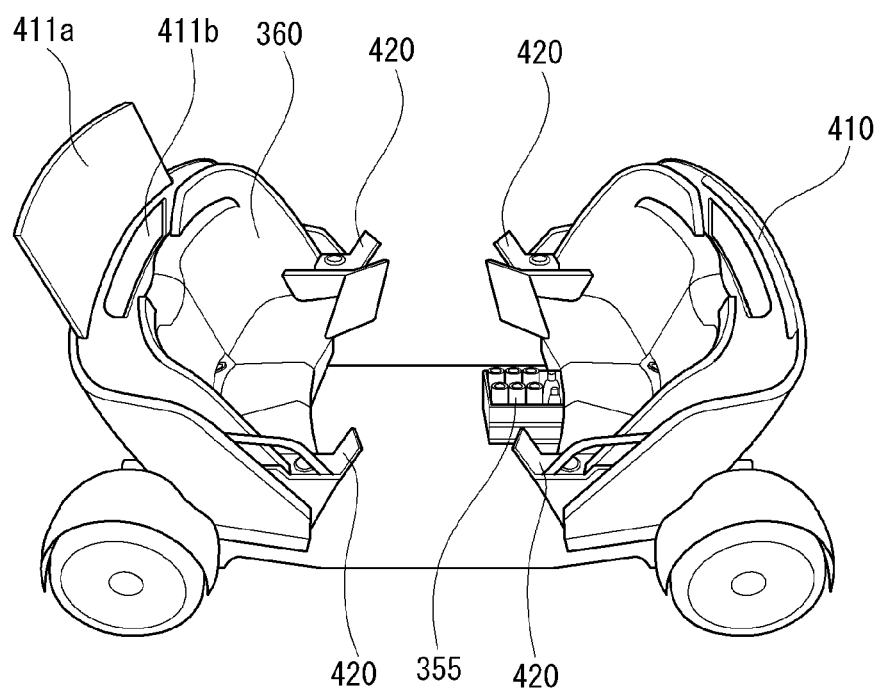
FIG. 5 is a diagram illustrating the interior of a vehicle according to an embodiment of the present disclosure.

FIG. 5 is a diagram showing the interior of the vehicle according to an embodiment of the present disclosure.

Figure 6:
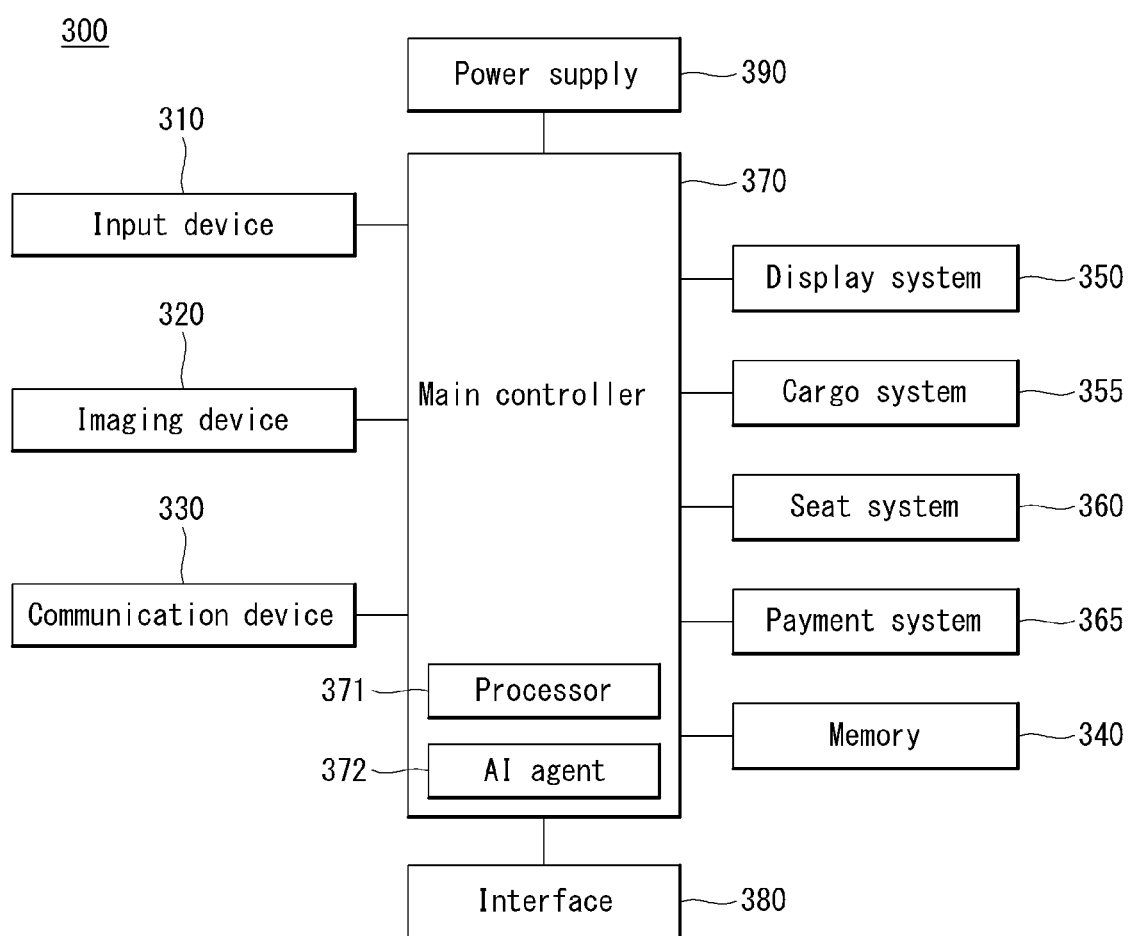
FIG. 6 is a block diagram referred to in description of a cabin system for a vehicle according to an embodiment of the present disclosure.

FIG. 6 is a block diagram referred to in description of a cabin system for a vehicle according to an embodiment of the present disclosure.

(1) Components of Cabin

Referring to FIGS. 5 and 6, a cabin system 300 for a vehicle (hereinafter, a cabin system) can be defined as a convenience system for a user who uses the vehicle 10. The cabin system 300 can be explained as a high-end system including a display system 350, a cargo system 355, a seat system 360 and a payment system 365. The cabin system 300 may include a main controller 370, a memory 340, an interface 380, a power supply 390, an input device 310, an imaging device 320, a communication device 330, the display system 350, the cargo system 355, the seat system 360 and the payment system 365. The cabin system 300 may further include components in addition to the components described in this specification or may not include some of the components described in this specification according to embodiments.

1) Main Controller

The main controller 370 can be electrically connected to the input device 310, the communication device 330, the display system 350, the cargo system 355, the seat system 360 and the payment system 365 and exchange signals with these components. The main controller 370 can control the input device 310, the communication device 330, the display system 350, the cargo system 355, the seat system 360 and the payment system 365. The main controller 370 may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may be configured as at least one sub-controller. The main controller 370 may include a plurality of sub-controllers according to an embodiment. The plurality of sub-controllers may individually control the devices and systems included in the cabin system 300. The devices and systems included in the cabin system 300 may be grouped by function or grouped on the basis of seats on which a user can sit.

The main controller 370 may include at least one processor 371. Although FIG. 6 illustrates the main controller 370 including a single processor 371, the main controller 371 may include a plurality of processors. The processor 371 may be categorized as one of the above-described sub-controllers.

The processor 371 can receive signals, information or data from a user terminal through the communication device 330. The user terminal can transmit signals, information or data to the cabin system 300.

The processor 371 can identify a user on the basis of image data received from at least one of an internal camera and an external camera included in the imaging device. The processor 371 can identify a user by applying an image processing algorithm to the image data. For example, the processor 371 may identify a user by comparing information received from the user terminal with the image data. For example, the information may include at least one of route information, body information, fellow passenger information, baggage information, position information, preferred content information, preferred food information, disability information and use history information of a user.

The main controller 370 may include an artificial intelligence (AI) agent 372. The AI agent 372 can perform machine learning on the basis of data acquired through the input device 310. The AI agent 371 can control at least one of the display system 350, the cargo system 355, the seat system 360 and the payment system 365 on the basis of machine learning results.

2) Essential Components

The memory 340 is electrically connected to the main controller 370. The memory 340 can store basic data about units, control data for operation control of units, and input/output data. The memory 340 can store data processed in the main controller 370. Hardware-wise, the memory 340 may be configured using at least one of a ROM, a RAM, an EPROM, a flash drive and a hard drive. The memory 340 can store various types of data for the overall operation of the cabin system 300, such as a program for processing or control of the main controller 370. The memory 340 may be integrated with the main controller 370.

The interface 380 can exchange signals with at least one electronic device included in the vehicle 10 in a wired or wireless manner. The interface 380 may be configured using at least one of a communication module, a terminal, a pin, a cable, a port, a circuit, an element and a device.

The power supply 390 can provide power to the cabin system 300. The power supply 390 can be provided with power from a power source (e.g., a battery) included in the vehicle 10 and supply the power to each unit of the cabin system 300. The power supply 390 can operate according to a control signal supplied from the main controller 370. For example, the power supply 390 may be implemented as a switched-mode power supply (SMPS).

The cabin system 300 may include at least one printed circuit board (PCB). The main controller 370, the memory 340, the interface 380 and the power supply 390 may be mounted on at least one PCB.

3) Input Device

The input device 310 can receive a user input. The input device 310 can convert the user input into an electrical signal. The electrical signal converted by the input device 310 can be converted into a control signal and provided to at least one of the display system 350, the cargo system 355, the seat system 360 and the payment system 365. The main controller 370 or at least one processor included in the cabin system 300 can generate a control signal based on an electrical signal received from the input device 310.

The input device 310 may include at least one of a touch input unit, a gesture input unit, a mechanical input unit and a voice input unit. The touch input unit can convert a user's touch input into an electrical signal. The touch input unit may include at least one touch sensor for detecting a user's touch input. According to an embodiment, the touch input unit can realize a touch screen by integrating with at least one display included in the display system 350. Such a touch screen can provide both an input interface and an output interface between the cabin system 300 and a user. The gesture input unit can convert a user's gesture input into an electrical signal. The gesture input unit may include at least one of an infrared sensor and an image sensor for detecting a user's gesture input. According to an embodiment, the gesture input unit can detect a user's three-dimensional gesture input. To this end, the gesture input unit may include a plurality of light output units for outputting infrared light or a plurality of image sensors. The gesture input unit may detect a user's three-dimensional gesture input using TOF (Time of Flight), structured light or disparity. The mechanical input unit can convert a user's physical input (e.g., press or rotation) through a mechanical device into an electrical signal. The mechanical input unit may include at least one of a button, a dome switch, a jog wheel and a jog switch. Meanwhile, the gesture input unit and the mechanical input unit may be integrated. For example, the input device 310 may include a jog dial device that includes a gesture sensor and is formed such that it can be inserted/ejected into/from a part of a surrounding structure (e.g., at least one of a seat, an armrest and a door). When the jog dial device is parallel to the surrounding structure, the jog dial device can serve as a gesture input unit. When the jog dial device is protruded from the surrounding structure, the jog dial device can serve as a mechanical input unit. The voice input unit can convert a user's voice input into an electrical signal. The voice input unit may include at least one microphone. The voice input unit may include a beam forming MIC.

4) Imaging Device

The imaging device 320 can include at least one camera. The imaging device 320 may include at least one of an internal camera and an external camera. The internal camera can capture an image of the inside of the cabin. The external camera can capture an image of the outside of the vehicle. The internal camera can acquire an image of the inside of the cabin. The imaging device 320 may include at least one internal camera. It is desirable that the imaging device 320 include as many cameras as the number of passengers who can ride in the vehicle. The imaging device 320 can provide an image acquired by the internal camera. The main controller 370 or at least one processor included in the cabin system 300 can detect a motion of a user on the basis of an image acquired by the internal camera, generate a signal on the basis of the detected motion and provide the signal to at least one of the display system 350, the cargo system 355, the seat system 360 and the payment system 365. The external camera can acquire an image of the outside of the vehicle. The imaging device 320 may include at least one external camera. It is desirable that the imaging device 320 include as many cameras as the number of doors through which passengers ride in the vehicle. The imaging device 320 can provide an image acquired by the external camera. The main controller 370 or at least one processor included in the cabin system 300 can acquire user information on the basis of the image acquired by the external camera. The main controller 370 or at least one processor included in the cabin system 300 can authenticate a user or acquire body information (e.g., height information, weight information, etc.), fellow passenger information and baggage information of a user on the basis of the user information.

5) Communication Device

The communication device 330 can exchange signals with external devices in a wireless manner. The communication device 330 can exchange signals with external devices through a network or directly exchange signals with external devices. External devices may include at least one of a server, a mobile terminal and another vehicle. The communication device 330 may exchange signals with at least one user terminal. The communication device 330 may include an antenna and at least one of an RF circuit and an RF element which can implement at least one communication protocol in order to perform communication.

According to an embodiment, the communication device 330 may use a plurality of communication protocols. The communication device 330 may switch communication protocols according to a distance to a mobile terminal.

For example, the communication device can exchange signals with external devices on the basis of C-V2X (Cellular V2X). For example, C-V2X may include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

6) Display System

The display system 350 can display graphic objects. The display system 350 may include at least one display device. For example, the display system 350 may include a first display device 410 for common use and a second display device 420 for individual use.

6.1) Common Display Device

The first display device 410 may include at least one display 411 which outputs visual content. The display 411 included in the first display device 410 may be realized by at least one of a flat panel display, a curved display, a rollable display and a flexible display. For example, the first display device 410 may include a first display 411 which is positioned behind a seat and formed to be inserted/ejected into/from the cabin, and a first mechanism for moving the first display 411. The first display 411 may be disposed such that it can be inserted/ejected into/from a slot formed in a seat main frame. According to an embodiment, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images can be displayed on both sides thereof. For example, the first display device 410 may be disposed on the ceiling inside the cabin and include a third display formed to be flexible and a third mechanism for bending or unbending the third display. According to an embodiment, the display system 350 may further include at least one processor which provides a control signal to at least one of the first display device 410 and the second display device 420. The processor included in the display system 350 can generate a control signal on the basis of a signal received from at last one of the main controller 370, the input device 310, the imaging device 320 and the communication device 330.

A display area of a display included in the first display device 410 may be divided into a first area 411a and a second area 411b. The first area 411a can be defined as a content display area. For example, the first area 411 may display at least one of graphic objects corresponding to can display entertainment content (e.g., movies, sports, shopping, food, etc.), video conferences, food menu and augmented reality screens. The first area 411a may display graphic objects corresponding to traveling situation information of the vehicle 10. The traveling situation information may include at least one of object information outside the vehicle, navigation information and vehicle state information. The object information outside the vehicle may include information on presence or absence of an object, positional information of an object, information on a distance between the vehicle and an object, and information on a relative speed of the vehicle with respect to an object. The navigation information may include at least one of map information, information on a set destination, route information according to setting of the destination, information on various objects on a route, lane information and information on the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal position information, vehicle engine temperature information, etc. The second area 411b can be defined as a user interface area. For example, the second area 411b may display an AI agent screen. The second area 411b may be located in an area defined by a seat frame according to an embodiment. In this case, a user can view content displayed in the second area 411b between seats. The first display device 410 may provide hologram content according to an embodiment. For example, the first display device 410 may provide hologram content for each of a plurality of users such that only a user who requests the content can view the content.

6.2) Display Device for Individual Use

The second display device 420 can include at least one display 421. The second display device 420 can provide the display 421 at a position at which only an individual passenger can view display content. For example, the display 421 may be disposed on an armrest of a seat. The second display device 420 can display graphic objects corresponding to personal information of a user. The second display device 420 may include as many displays 421 as the number of passengers who can ride in the vehicle. The second display device 420 can realize a touch screen by forming a layered structure along with a touch sensor or being integrated with the touch sensor. The second display device 420 can display graphic objects for receiving a user input for seat adjustment or indoor temperature adjustment.

7) Cargo System

The cargo system 355 can provide items to a user at the request of the user. The cargo system 355 can operate on the basis of an electrical signal generated by the input device 310 or the communication device 330. The cargo system 355 can include a cargo box. The cargo box can be hidden in a part under a seat. When an electrical signal based on user input is received, the cargo box can be exposed to the cabin. The user can select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 can provide a user customized seat to a user. The seat system 360 can operate on the basis of an electrical signal generated by the input device 310 or the communication device 330. The seat system 360 can adjust at least one element of a seat on the basis of acquired user body data. The seat system 360 may include a user detection sensor (e.g., a pressure sensor) for determining whether a user sits on a seat. The seat system 360 may include a plurality of seats on which a plurality of users can sit. One of the plurality of seats can be disposed to face at least another seat. At least two users can set facing each other inside the cabin.

9) Payment System

The payment system 365 can provide a payment service to a user. The payment system 365 can operate on the basis of an electrical signal generated by the input device 310 or the communication device 330. The payment system 365 can calculate a price for at least one service used by the user and request the user to pay the calculated price.

(2) Autonomous Vehicle Usage Scenarios

Figure 7:
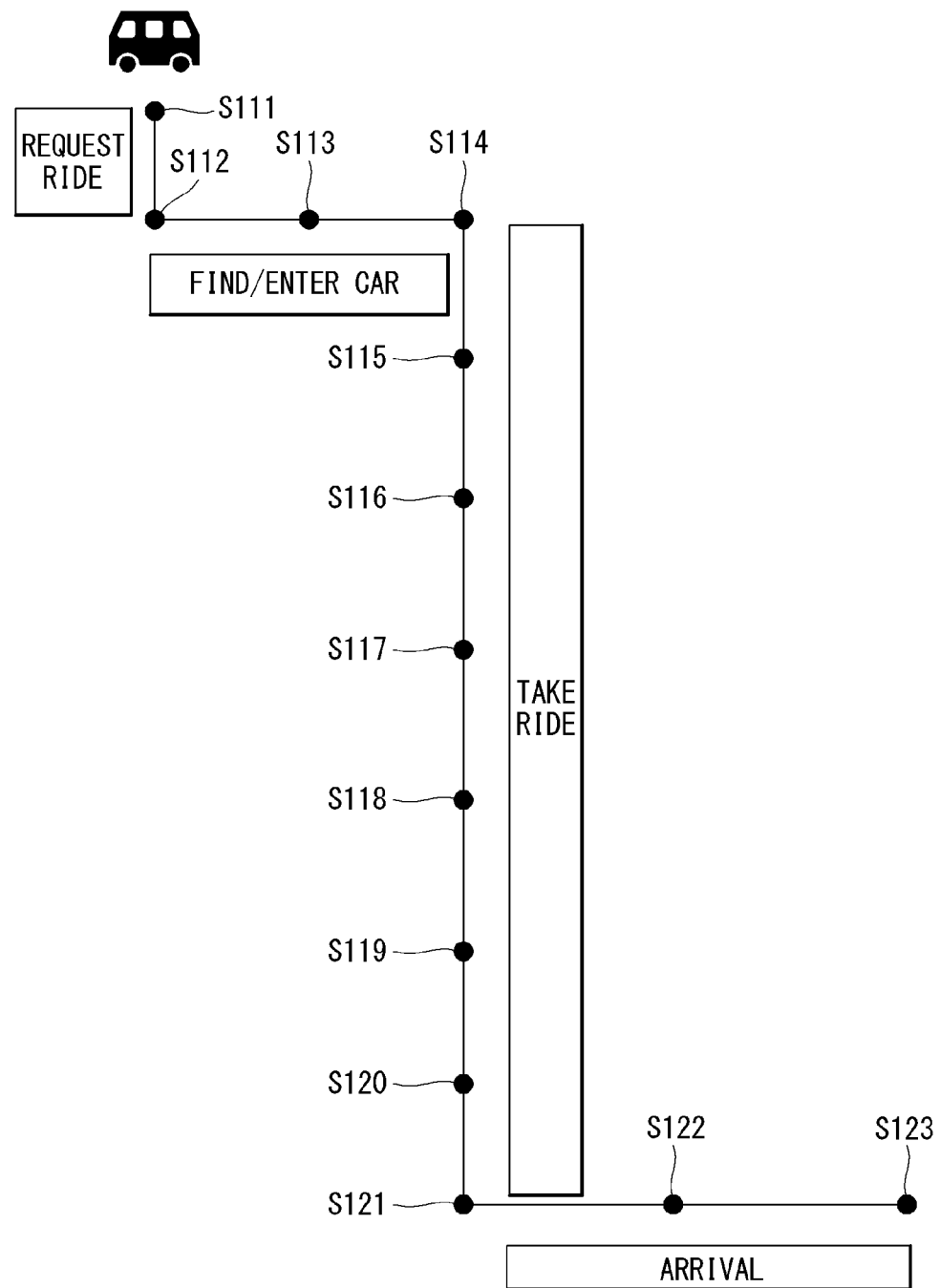
FIG. 7 is a diagram for describing a use scenario of a user according to an embodiment of the present disclosure.

FIG. 7 is a diagram referred to in description of a usage scenario of a user according to an embodiment of the present disclosure.

1) Destination Prediction Scenario

A first scenario S111 is a scenario for prediction of a destination of a user. An application which can operate in connection with the cabin system 300 can be installed in a user terminal. The user terminal can predict a destination of a user on the basis of user's contextual information through the application. The user terminal can provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device can scan a user to acquire body data and baggage data of the user. The body data and baggage data of the user can be used to set a layout. The body data of the user can be used for user authentication. The scanning device may include at least one image sensor. The image sensor can acquire a user image using light of the visible band or infrared band.

The seat system 360 can set a cabin interior layout on the basis of at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light can be disposed on the floor of the cabin. When a user riding in the vehicle is detected, the cabin system 300 can turn on the guide light such that the user sits on a predetermined seat among a plurality of seats. For example, the main controller 370 may realize a moving light by sequentially turning on a plurality of light sources over time from an open door to a predetermined user seat.

4) Seat Adjustment Service Scenario

A fourth scenario S114 is a seat adjustment service scenario. The seat system 360 can adjust at least one element of a seat that matches a user on the basis of acquired body information.

5) Personal Content Provision Scenario

A fifth scenario S115 is a personal content provision scenario. The display system 350 can receive user personal data through the input device 310 or the communication device 330. The display system 350 can provide content corresponding to the user personal data.

6) Item Provision Scenario

A sixth scenario S116 is an item provision scenario. The cargo system 355 can receive user data through the input device 310 or the communication device 330. The user data may include user preference data, user destination data, etc. The cargo system 355 can provide items on the basis of the user data.

7) Payment Scenario

A seventh scenario S117 is a payment scenario. The payment system 365 can receive data for price calculation from at least one of the input device 310, the communication device 330 and the cargo system 355. The payment system 365 can calculate a price for use of the vehicle by the user on the basis of the received data. The payment system 365 can request payment of the calculated price from the user (e.g., a mobile terminal of the user).

8) Display System Control Scenario of User

An eighth scenario S118 is a display system control scenario of a user. The input device 310 can receive a user input having at least one form and convert the user input into an electrical signal. The display system 350 can control displayed content on the basis of the electrical signal.

9) AI Agent Scenario

A ninth scenario S119 is a multi-channel artificial intelligence (AI) agent scenario for a plurality of users. The AI agent 372 can discriminate user inputs from a plurality of users. The AI agent 372 can control at least one of the display system 350, the cargo system 355, the seat system

360 and the payment system 365 on the basis of electrical signals obtained by converting user inputs from a plurality of users.

10) Multimedia Content Provision Scenario for Multiple Users

A tenth scenario S120 is a multimedia content provision scenario for a plurality of users. The display system 350 can provide content that can be viewed by all users together. In this case, the display system 350 can individually provide the same sound to a plurality of users through speakers provided for respective seats. The display system 350 can provide content that can be individually viewed by a plurality of users. In this case, the display system 350 can provide individual sound through a speaker provided for each seat.

11) User Safety Secure Scenario

An eleventh scenario S121 is a user safety secure scenario. When information on an object around the vehicle which threatens a user is acquired, the main controller 370 can control an alarm with respect to the object around the vehicle to be output through the display system 350.

12) Personal Belongings Loss Prevention Scenario

A twelfth scenario S122 is a user's belongings loss prevention scenario. The main controller 370 can acquire data about user's belongings through the input device 310. The main controller 370 can acquire user motion data through the input device 310. The main controller 370 can determine whether the user exits the vehicle leaving the belongings in the vehicle on the basis of the data about the belongings and the motion data. The main controller 370 can control an alarm with respect to the belongings to be output through the display system 350.

13) Alighting Report Scenario

A thirteenth scenario S123 is an alighting report scenario. The main controller 370 can receive alighting data of a user through the input device 310. After the user exits the vehicle, the main controller 370 can provide report data according to alighting to a mobile terminal of the user through the communication device 330. The report data can include data about a total charge for using the vehicle 10.

Container

A container may be a light-weight virtualization instance executed in a computer system instance including programs, data, and system libraries. When the container is executed, a program (i.e., process) being executed may be executed independently of another process being executed in the same computer system instance.

Each of the containers may have its own unique name space, and applications executed within the containers may have a state in which they can access only available resources within the container name spaces. Accordingly, the containers may be an effective method for executing at least one single application in a unique name space.

A container package may enable at least one container to be executed in a single operation instance without overhead which may be consumed to start and maintain virtual machines in order to execute a separate user space instance. An example of the container package may be a docker container engine.

The container may be written using the Java language and may be a Servlet container as software capable of executing an application program using JSP and Servlet.

Such a container has types of a Servlet container, a JSP container, an EJB container, etc. Representative containers may include Jakarta Tomcat (JSP), RESIN, Web Logic, Web To-Be, etc. The container may be a web browser form that opens a web page or stores a web page in the Internet.

The container engine may position an application in the container. The container engine may be a docker, but is not essentially limited thereto.

Figure 8:
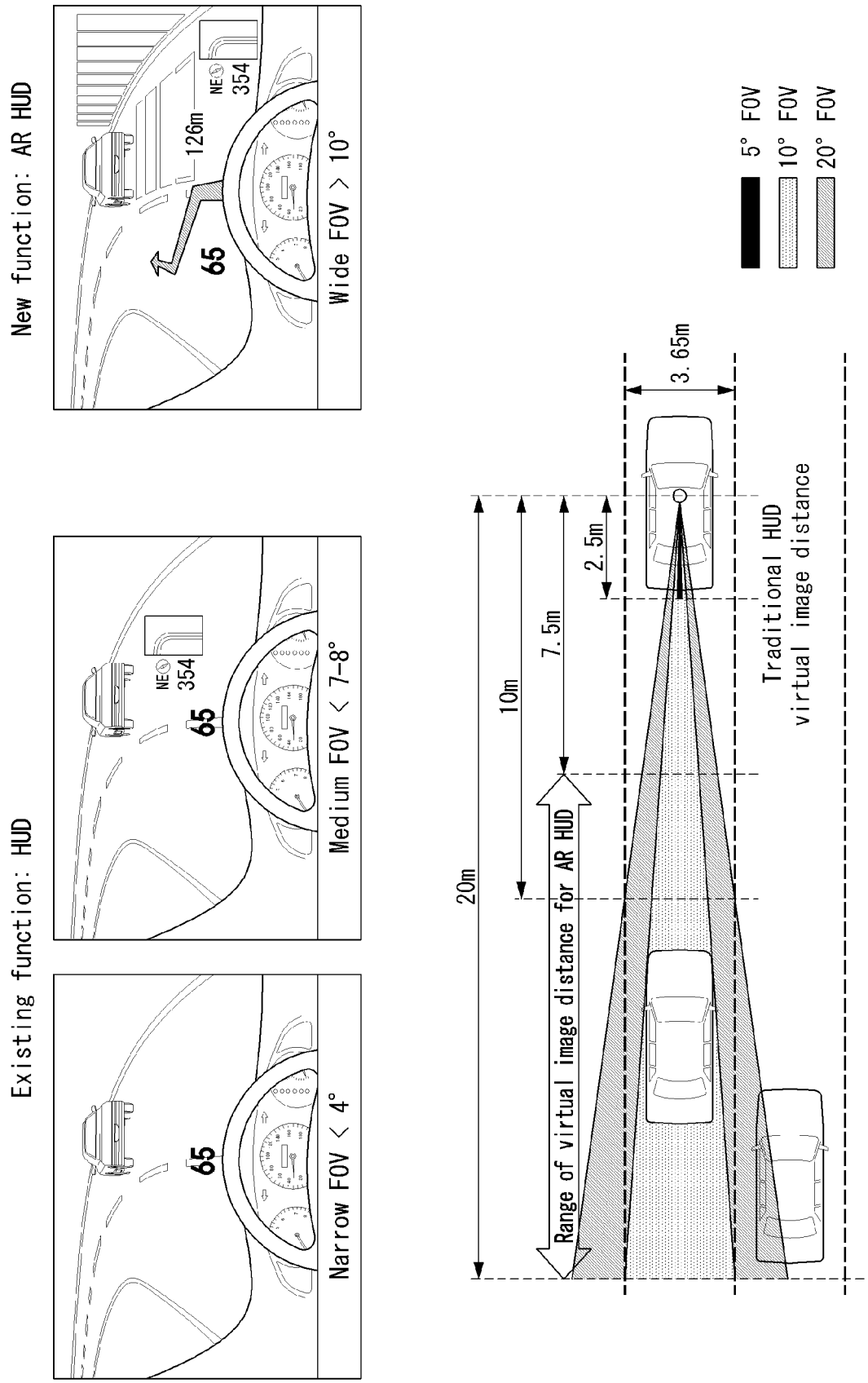
FIG. 8 is a diagram for describing an example of a service when a HUD device providing AR information is added as a new device according to an embodiment of the present disclosure.

FIG. 8 is a diagram for describing an example of a service when a HUD device providing AR information is added as a new device according to an embodiment of the present disclosure.

Referring to FIG. 8, core information, such as an advanced driver assistance system (ADAS) alarm and a navigation signal may be projected onto a visual field of a driver through an interaction with a real entity, a marking operation, etc. based on real-time sensor data.

An augmented reality head-up display (AR HUD) can significantly improve the situation recognition of a driver by directly positioning graphics in the visual field of the driver through an enhanced real object. The projected HUD graphics may be positioned near the front bumper of a vehicle. A distance between the driver and the HUD graphics is called a virtual image distance (VID). Furthermore, a display size may be defined as a horizontal and vertical field of view (FOV) designated in a degree unit.

The AR HUD may display graphics that directly overlay important information on the real world through an interaction with the FOV of a driver, in addition to displaying assistant static information. To this end, a significant amount of real-time vehicle sensor data needs to be integrated.

Conventional ADAS warning information may be chiefly displayed and output through a flickering symbol or alarm sound. However, the AR HUD may identify a threat by directly displaying the threat within the FOV of a driver. AR graphics are overlaid with a real object so that a driver can immediately recognize a threat and rapidly take proper measures, such as braking, when recognizing a road obstacle. If ADAS warning is displayed through such a method, in particularly, when a driver drives a vehicle at night or a condition having low visibility, the situation recognition of the driver can be greatly improved.

One of core requirements of the AR HUD is the ability to project an image at a distance of at least 7 m in front of a driver. 10~20 m is preferred. If an AR image is projected at this distance, the image looks like being converged with the real world. The AR image looks like being naturally extended from a highlighted object. The function of a human's eye to identify a depth from another real object at 7 m or more is greatly reduced. Accordingly, to generate an image converged with a real object is much advantageous as the VID is longer. In this case, since the adaptation time of an eye is reduced, safer driving is possible through AR HUD information as a driver grows older.

FIG. 8 discloses an FOV VID difference between a conventional HUD and the AR HUD, and further illustrates how HUD graphics interact with a real object in an AR HUD display. Meanwhile, in FIG. 8, the HUD having the existing function statically displays a graphic image. In contrast, the AR HUD configures real-time information as AR graphics by incorporating a real object and road situation in a front road in real time, and provides the configured real-time information in real time. To this end, a vehicle requires a process of recognizing a newly added AR HDU device and naturally associating real-time sensor data of the vehicle with the new device.

This disclosure discloses a process of association with real-time sensor data of a vehicle for a function implementation of a new device based on a data-centered architecture based on a container.

Figure 9:
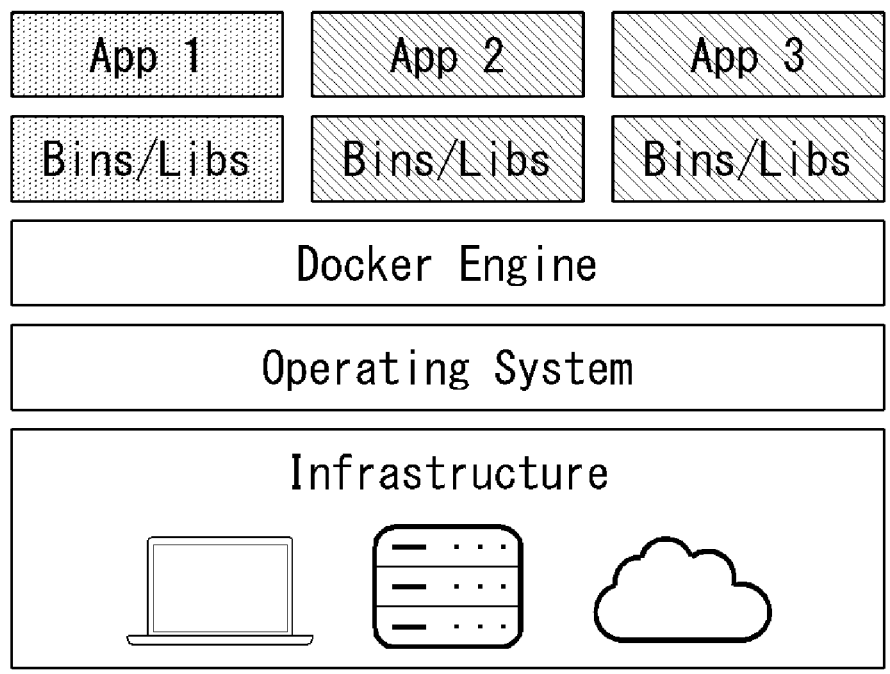
FIG. 9 is a diagram for describing a system architecture based on a container, which may be applied to an embodiment of the present disclosure.

FIG. 9 is a diagram for describing a system architecture based on a container, which may be applied to an embodiment of the present disclosure.

Referring to FIG. 9, in general, a virtual machine provides "isolation" in such a way to assign one OS instance to each of applications that need to be compartmentalized. Isolation in the virtual machine is a method for almost perfect isolation, but is accompanied by significant expenses. The reason for this is that each operation instance consumes memory and processing power which may be more effectively allocated to an application itself.

However, in the case of a container, each application and its dependency uses an isolated segment of an OS resource. A container runtime may set up or delete a container using a container service having a low level, which is provided by a host OS.

A control group (cgoups) and a name space (namespaces) are included in a Linux kernel function that produces a wall between a container and another process executed in a host. The cgroup manages the amount of system resources used of a process group, such as isolation, a CPU, and a memory. The name space processes resource isolation of one process. The cgroup manages the resources of a process group. The cgroup and the name space may be combined to implement a Linux container (LXC).

The Linux container is a virtualization scheme having a Linux OS level, which executes a Linux system separated into several systems from a single host. The container isolates applications in the OS. That is, this means that a user can execute all other things in one or more isolated containers, while operating a minimized Linux OS.

The docker improves the mobility and flexibility of the container in the Linux container. If a docker container is used, workload can be distributed, duplicated, moved and backed up more easily and rapidly compared to a case where the virtual machine is used. The docker provides the same flexibility as a cloud to all infrastructures capable of executing a container.

The docker generates a container image corresponding to "disclosures" for a software method to be executed in a specific container. An image library may be built using the container image tool of the docker. The images may be converted into a new image, and an app may be executed as an image through a local or remote infrastructure.

Furthermore, the docker may coordinate an operation between containers, and may build an application stack by connecting containers. This may be advanced into a container orchestration, etc., which is provided by third party products.

Furthermore, the Linux container may construct an API and an ecosystem, which may enable developers to more variously use a container. For example, the Linux container has been developed in the form of a lib container (Libcontainer), that is, a self-runtime. The lib container may provide more various service layers to a container. The docker is a Linux or window utility capable of efficiently generating, outputting and executing a container.

Application App1, App2, and App3 illustrated in FIG. 9 may mean respective containers for supporting services, such as navigation, multimedia, connectivity, and voice assistance. The containers are built on a docker engine and share a Linux kernel.

Figure 10A:
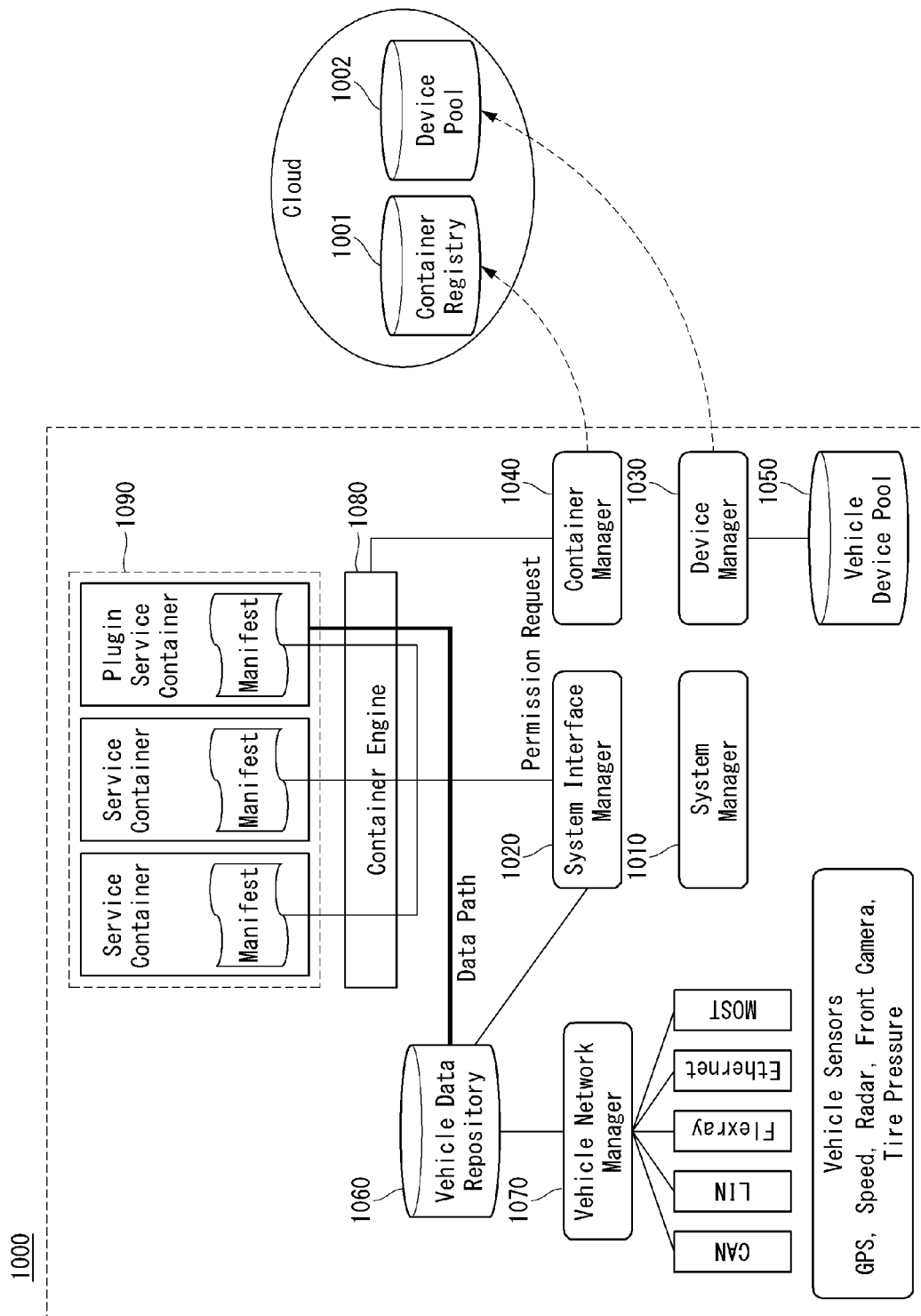
FIGS. 10A through 10C are diagrams for describing a system structure based on a data-centered architecture in a vehicle according to an embodiment of the present disclosure.
Figure 10B:
Figure 10C:
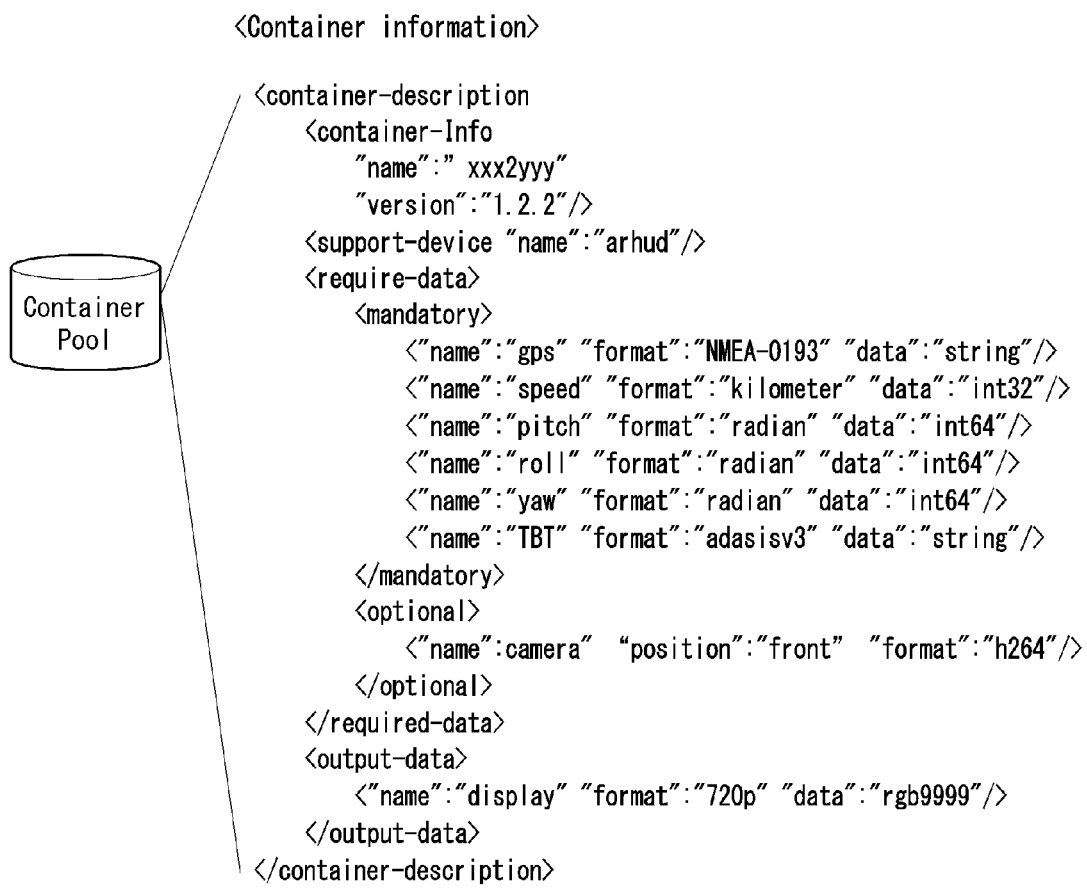
Figure 11:
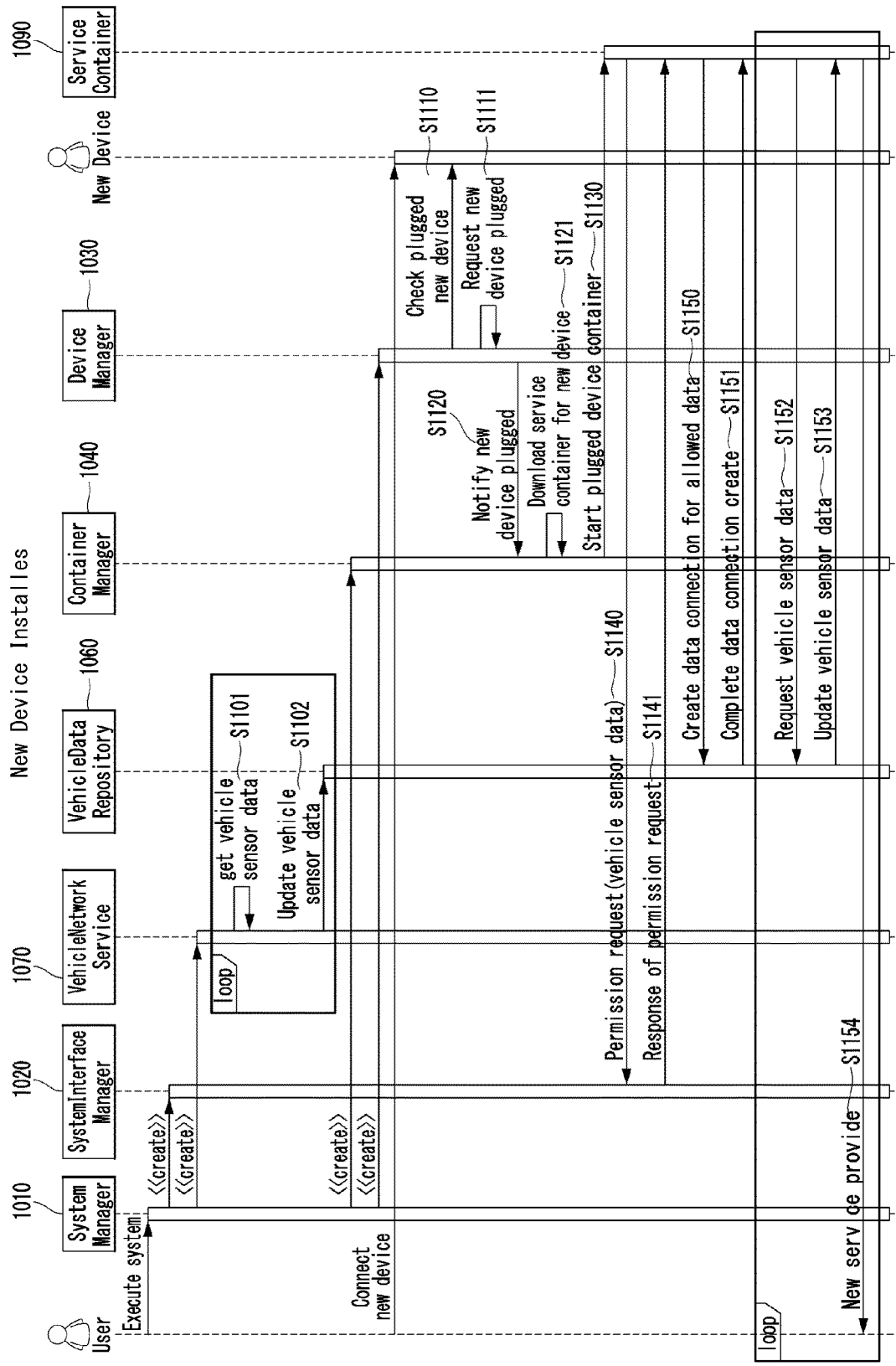
FIG. 11 is a sequence diagram for describing an operation of the system illustrated in FIGS. 10A through 10C.

FIGS. 10A through 10C are diagrams for describing a system structure based on a data-centered architecture in a vehicle according to an embodiment of the present disclosure. FIG. 11 is a sequence diagram for describing an operation of the system illustrated in FIGS. 10A through 10C.

A method of activating a new device in a vehicle is described with reference to FIGS. 10A through 10 C and FIG. 11.

Referring to FIG. 10A, the system may be configured with a system 1000 in a vehicle and a cloud environment. The system 1000 of the vehicle may be configured with container systems 1080 and 1090 necessary for a container operation, systems 1050, 1060, and 1070 for processing vehicle data, and management systems 1010, 1020, 1030, and 1040 which perform a data association between the container system and the vehicle system and an association function with a cloud system.

The management systems 1010, 1020, 1030, and 1040 performing the data association between the container system and the vehicle system and the association function with the cloud system may include a system manager 1010, a system interface manager 1020, a container manager 1040, and a device manager 1030.

The system manager 1010 may activate the system interface manager 1020, the vehicle network manager 1070, the container manager 1040, and the device manager 1030 in order to execute the system of the vehicle. The vehicle network manager 1070 gets at least one sensor data (S1101), and transmits the gotten sensor data to a vehicle data repository 1060 so that the sensor data is stored (S1102). The process of getting and storing sensor data may be an operation continuously performed until the vehicle drives and stops.

The system interface manager 1020 and the container manager 1040 may perform the same function, and may be functionally isolated. When a new device is detected, the system interface manager 1020 opens a data path between the new device and the vehicle data repository 1060 so that the new device may use sensor data of the vehicle.

The device manager 1030 may identify a device mounted in the vehicle (S1110). Furthermore, if it is determined that the new device is mounted, the device manager 1030 may perform an operation of requesting new device information (S1111).

The device manager 1030 may check whether the device mounted in association with the vehicle device repository 1050 is a device stored in the vehicle device repository 1050. If the newly mounted device is a device not present in the vehicle device repository 1050, the device manager 1030 may download device information mounted in the device database 1002 of a cloud. Or the device manager 1030 may update the device database 1002 of the cloud with newly mounted device information. Or the device manager 1030 may update the vehicle device database 1050 locally present in the vehicle on the cloud.

FIG. 10B discloses an example of the device information stored in the vehicle device repository 1050. Referring to FIG. 10B, device information stored in the vehicle device repository 1050 may include a device name, version information, manufacturer information, interface information for data communication, power use information, a container name corresponding to a device, and container version information. Furthermore, the device information may include vehicle sensor data, that is, mandatory information necessary for a device operation. For example, in order to implement an AR-HUD function, if a front camera that is a new device is mounted, data, such as location information, speed, yaw, pitch, and roll of a vehicle as data necessary for a front camera operation, may be essential information.

Meanwhile, in FIG. 10A, the cloud may include a container repository 1001. The container repository 1001 may include device container information.

Referring to FIG. 10C, a container database located in the cloud may include pieces of container information each corresponding to at least one device mounted and executed in a vehicle. Container information of a device may further include a container name, a container version, the name (e.g., AR-HUD) of a device supported by a container, required vehicle sensing data, and information on the front camera as option information for AR-HUD support. Meanwhile, the vehicle sensing data is data gotten from the vehicle data repository 1060. A container needs to be assigned rights to access vehicle data in order to obtain vehicle data. Containers whose right setting has been completed through manifest may get vehicle data through the vehicle data repository 1060. Meanwhile, the container has a different service container for each type of device mounted in a vehicle. Information necessary for device execution may additionally require other data in addition to vehicle sensor data. For example, container information corresponding to the AR-HUD may also include front camera information for supporting the AR-HUD function and display information for outputting an AR graphic image in addition to the AR-HUD device.

Information necessary to execute the AR-HUD function may be various. The AR-HUD container may get necessary information from the sensing data of a vehicle. The AR-HUD container illustrated in FIG. 10C describes an example in which necessary information is got from the sensing data of a vehicle.

When a new device is mounted, the device manager 1030 may transmit this to the container manager 1040 (S1121).

When the device manager 1030 detects the newly mounted device, the container manager 1040 may control the device manager 1030 to download a corresponding container in order to activate the new device (S1121).

Furthermore, the container manager 1040 may control the service container 1090 to start an operation of a container corresponding to the newly mounted device (S1130).

The service container 1090 may transmit a permission request to the system interface manager 1020 for access to the vehicle sensor data (S1140). The system interface manager 1120 may transmit a response to the permission request to the service container 1090 (S1141).

Meanwhile, the following table divides and displays a permission list and permission data. Permissions requested by containers may be grouped and managed depending on requested data and/or a device type. Furthermore, the permission data may include detailed vehicle sensing data necessary for services provided by a new device.

TABLE 1

| Permission Group | Permissions |
| --- | --- |
| permission-group.gps | permission.utc |
| | permission.longitude |
| | permission.latitude |
| | permission.altitude |
| | permission.gpsquality |
| permission-group.vehicle | permission.speed |
| | permission.rpm |
| | permission.pitch |
| | permission.roll |
| | permission.yaw |
| permission-group.adas | permission.road_geometry |
| | permission.road_attribue |
| | permission.lane_geometry |

TABLE 1-continued

| Permission Group | Permissions |
| --- | --- |
| | permission.lane_attribute |
| | permission.poi_entry |
| | permission.poi_exit |
| | permission.road_condition |
| permission-group.navigation | permission.destination |
| | permission.route |
| | permission.tbt |
| permission-group.camera | permission.front |
| | permission.rear |
| | permission.left |
| | permission.right |

The system interface manager 1020 or the container manager 1040 may determine whether to permit or not permit data access for a container by analyzing a manifest. If the system interface manager 1020 permits the access request, this may mean that data reception by a new container is permitted.

Meanwhile, the container engine 1080 may be a docker engine for operating a container corresponding to each device mounted in a vehicle.

When a data connection between the service container 1090 and the vehicle data repository 1060 is completed, the service container 1090 may request the sensor data of the vehicle from the vehicle data repository 1060 (S1152). The vehicle data repository 1060 may update the sensor data so that the service container 1090 maintains a state available for new device activation.

Finally, the service container 1090 may provide a user with a service of the new device using a container corresponding to the new device.

A method of activating a new device based on a container in a vehicle is more specifically described.

Figure 12:
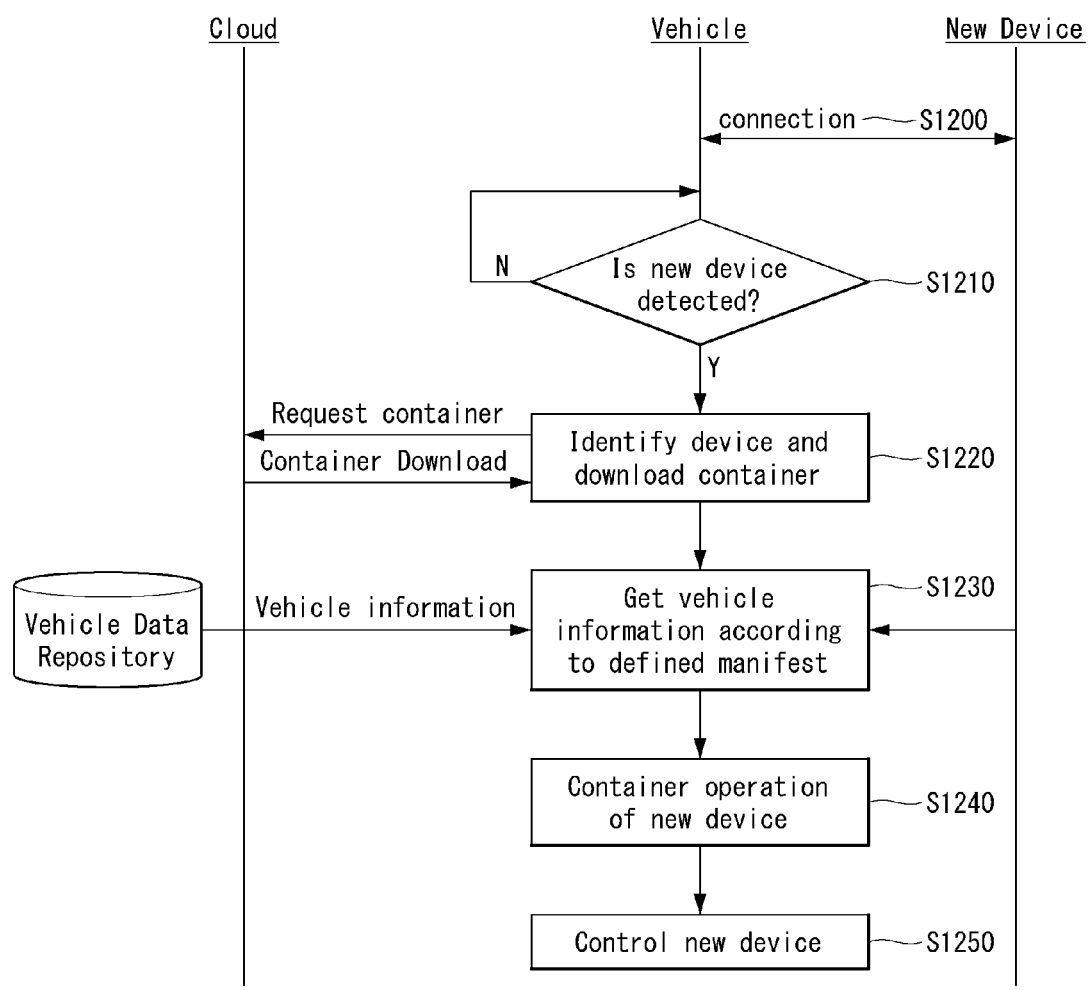
FIG. 12 is a flowchart of a method of activating a new device based on a container in a vehicle according to an embodiment of the present disclosure.

FIG. 12 is a flowchart of a method of activating a new device based on a container in a vehicle according to an embodiment of the present disclosure.

Referring to FIG. 12, a new device may be connected to a vehicle (S1200). If the new device has a problem with interface compatibility although it is connected to the vehicle, the vehicle may not detect the new device.

When the vehicle detects the new device (S1200), the vehicle may identify the new device (S1220). To identify, by the vehicle, the new device may be performed through a process of determining whether information of the newly connected new device is present in the local database or device within the vehicle. If new device information is present in the local device, the vehicle may transmit the new device information to the container manager. Furthermore, the vehicle may transmit identification information of the new device to the cloud. The cloud may search for a container corresponding to the new device, and may transmit the container to the vehicle.

The container manager may get vehicle information according to a defined manifest (S1230). Furthermore, the container manager reads the manifest, and controls the container corresponding to the new device to be executed by permitting Permission for the container (S1240). The vehicle may provide a given service by controlling the new device through the container corresponding to the new device (S1250).

Figure 13:
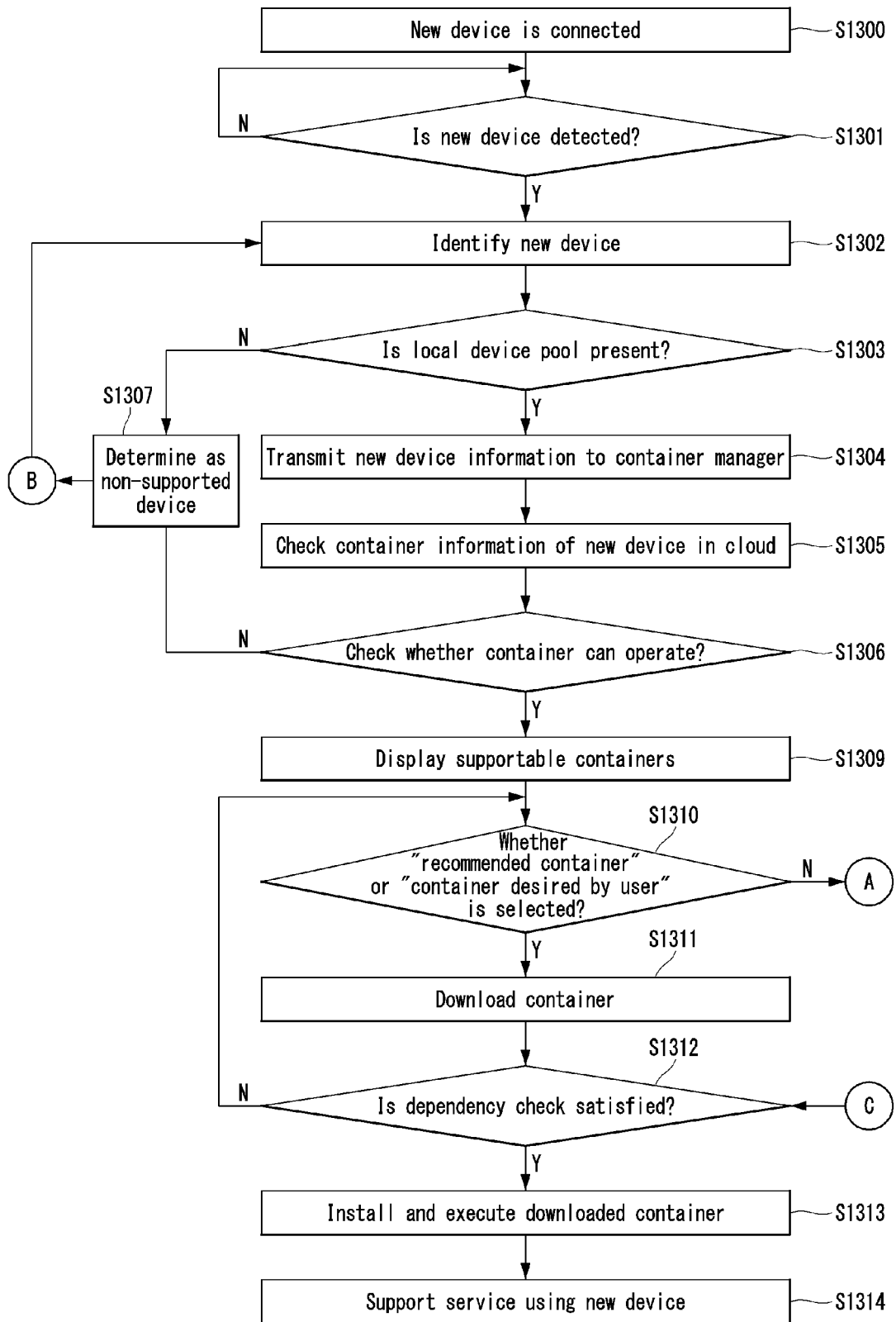
FIG. 13 is a flowchart for describing a process of downloading a new container according to an embodiment of the present disclosure.

FIG. 13 is a flowchart for describing a process of downloading a new container according to an embodiment of the present disclosure.

Referring to FIG. 13, a vehicle may detect a new device (S1301) when the new device is connected (S1300). When the new device is detected, the vehicle may perform an operation of identifying new device information (S1302).

The vehicle may include a database (e.g., the vehicle device pool 1050) for storing the vehicle device information.

The device manager 1030 may identify whether information of the new device is present in the vehicle device pool 1050 (S1303). If the new device information is present (S1303: YES), the device manager 1030 may transmit the new device information to the container manager (S1304). If it is determined that the new device information is not present (S1303: NO), the device manager 1030 may determine the new device as a non-supported device (S1307).

According to an embodiment of the present disclosure, if the new device is a non-supported device, a step B may be performed. This is more specifically described through FIG. 15.

The container manager 1040 may transmit, to the cloud, the new device information received from the device manager 1030. The cloud includes the container repository 1001, and may search the container repository 1001 for a container for activating the new device based on the new device information received from the vehicle. If a container corresponding to the new device is searched for in the container repository 1001, the cloud may transmit the retrieved container to the vehicle. The container manager 1040 may identify the container information received from the cloud (S1305).

Furthermore, the container manager 1030 may check whether the container received from the cloud can operate (S1306).

Whether the container can operate may be a process of checking whether the container received from the cloud can operate in the system of the vehicle. If it is determined that the received container cannot operate in the vehicle system normally, the container manager 1030 may determine the mounted device as a non-supported device (S1360: N, S1307).

If it is determined that the container received from the cloud can operate in the vehicle system normally, the container manager 1030 may display supportable containers through the display of the vehicle (S1309). The vehicle checks whether a "recommended container" or a "container desired by a user" is selected among the supportable containers displayed on the display (S1310).

Meanwhile, in the state in which the supportable containers have been displayed, if any item is not selected or if a container desired by a user is not present, a step A may be performed. This is more specifically described through FIG. 14.

When any one of the supportable containers is selected, the vehicle may download the selected container (S1311).

Thereafter, the vehicle may perform dependency check on the downloaded container (S1312). A container necessary for new device activation may have a package form. If any one of container packages is omitted, the normal execution of the container may be impossible. An operation of a step C may be added to the container dependency check. This is more specifically described through FIG. 16.

When the container dependency check is completed, the container manager 1030 installs the downloaded container on the system, executes the container (S1313), and supports a service using the new device (S1314).

Figure 14:
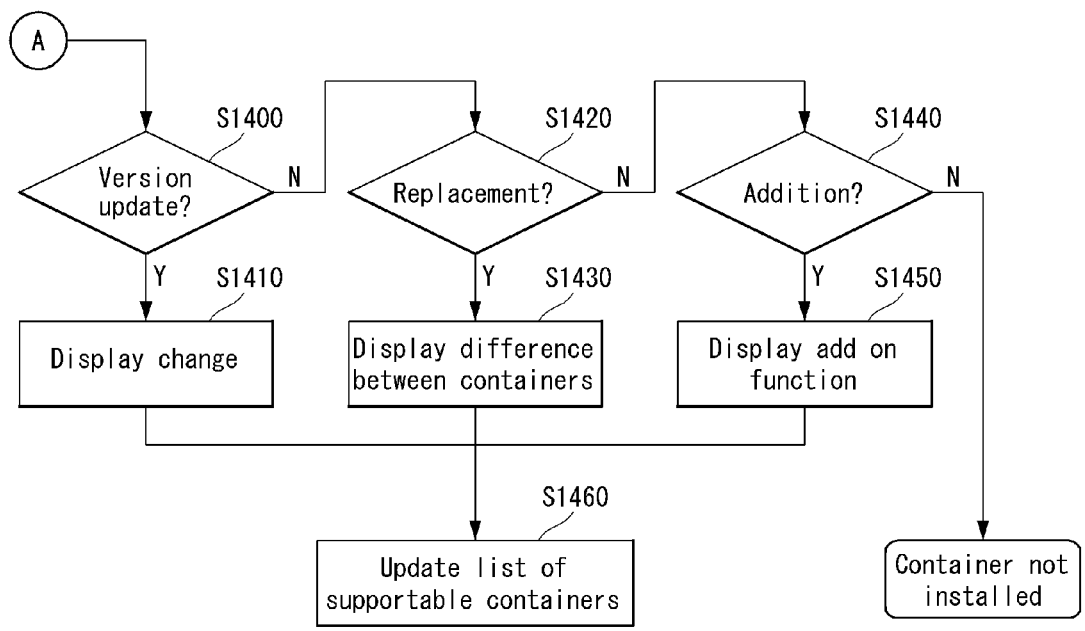
FIG. 14 is a flowchart for describing a process of a list of containers being updated according to an embodiment of the present disclosure.

FIG. 14 is a flowchart for describing a process of updating a list of containers according to an embodiment of the present disclosure.

The process may be a process of installing a new container corresponding to a new device if the new device is mounted and the container downloaded from the cloud is installed. However, if a vehicle has detected the new device, but the new device is a device having a history in which the new device has been previously mounted and executed, a process of installing the downloaded container is not simply performed, but a process of updating a list of containers may be performed.

Referring to FIG. 14, when a supportable container is displayed on a display, if any one of a recommended container or a desired container is not selected, the container manager 1030 may perform container version up, a container replacement or an operation for adding a container, not an operation of installing a new container.

For example, when a container version update is selected, the container manager 1030 may display a change on the display by comparing a previously installed container and a container downloaded from the cloud (S1410). Furthermore, the container manager 1030 may update a list of supportable containers.

Furthermore, For example, as a result of the comparison between the previously installed container and the container downloaded from the cloud, if a difference is detected in at least one of items configuring the container, the container manager 1030 may determine a container replacement situation (S1420), and may display a difference between containers on the display (S1430). Furthermore, the container manager 1030 may update a list of supportable containers.

Furthermore, for example, if it is not a version-up data and replacement situation, the container manager 1030 may determine an addition situation of some functions (S1440), and may display an Add on function on the display (S1450). Furthermore, the container manager 1030 may update a list of supportable containers.

If it is determined that it is not a container version update, replacement, or addition, the container manager 1030 may terminate the process as a container non-installation situation.

Figure 15:
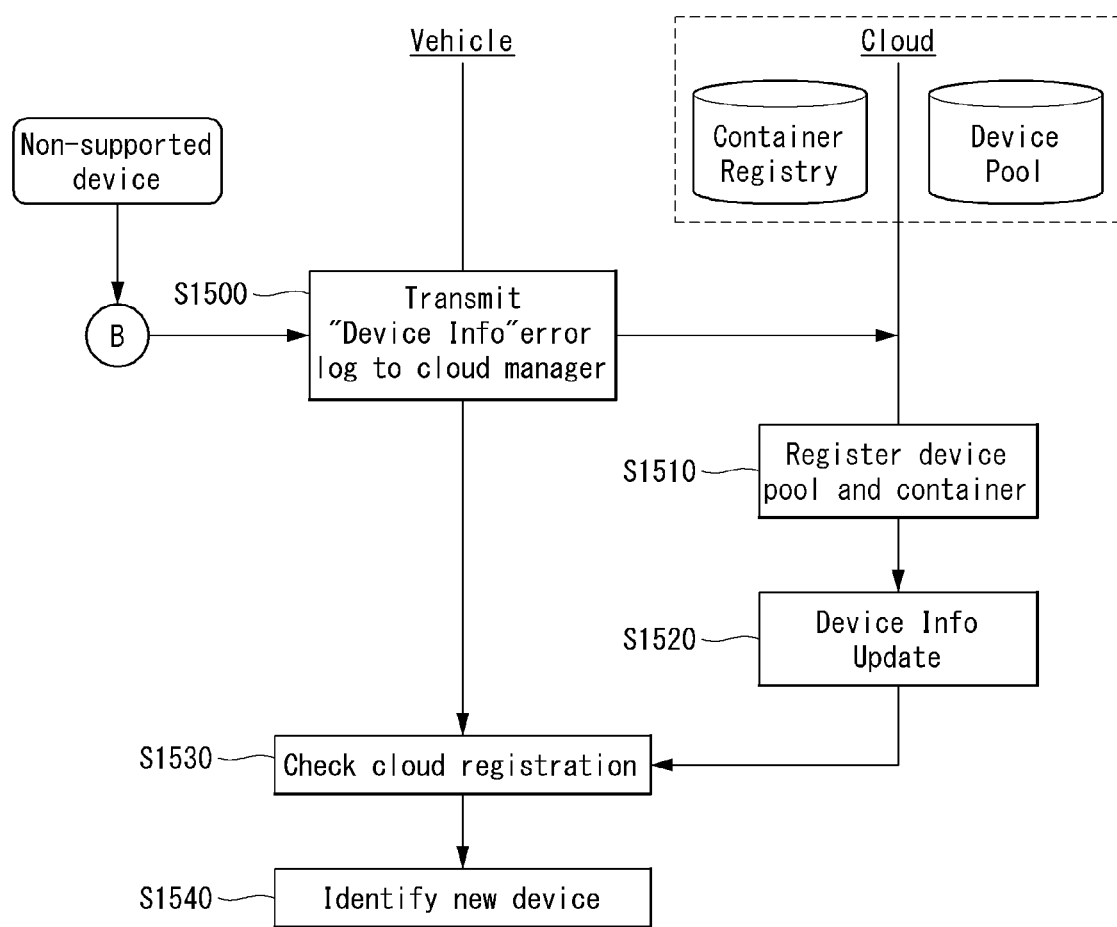
FIG. 15 is a flowchart for describing a processing method if a new device mounted in a vehicle is a non-supported device according to an embodiment of the present disclosure.

FIG. 15 is a flowchart for describing a processing method if a new device mounted in a vehicle is a non-supported device according to an embodiment of the present disclosure.

After a new device is detected in a vehicle, if the new device is not present in a device pool within the vehicle (S1303: NO in FIG. 13), if it is determined that a container received from the cloud does not operate in the vehicle system normally (S1303: NO in FIG. 13), the mounted new device may be determined as a non-supported device.

If the detected new device is recognized as a non-supported device, the device manager 1050 may transmit device information (Device Info) and an error log to the cloud manager (S1500).

The cloud manager may register the device information with the device pool through the container repository 1001 and the device pool 1002 on the cloud, and may perform container registration (S1510). The cloud manager updates the device pool 1002 (S1520), and transmits update information to the vehicle (S1520).

The vehicle checks that the new device has been registered with the cloud device pool 1002, and may update the device pool 1050 of the vehicle. Thereafter, the vehicle may perform a new device identification operation (S1540). An operation after the device identification may be performed identically with the operation after step S1302 in FIG. 13.

Figure 16:
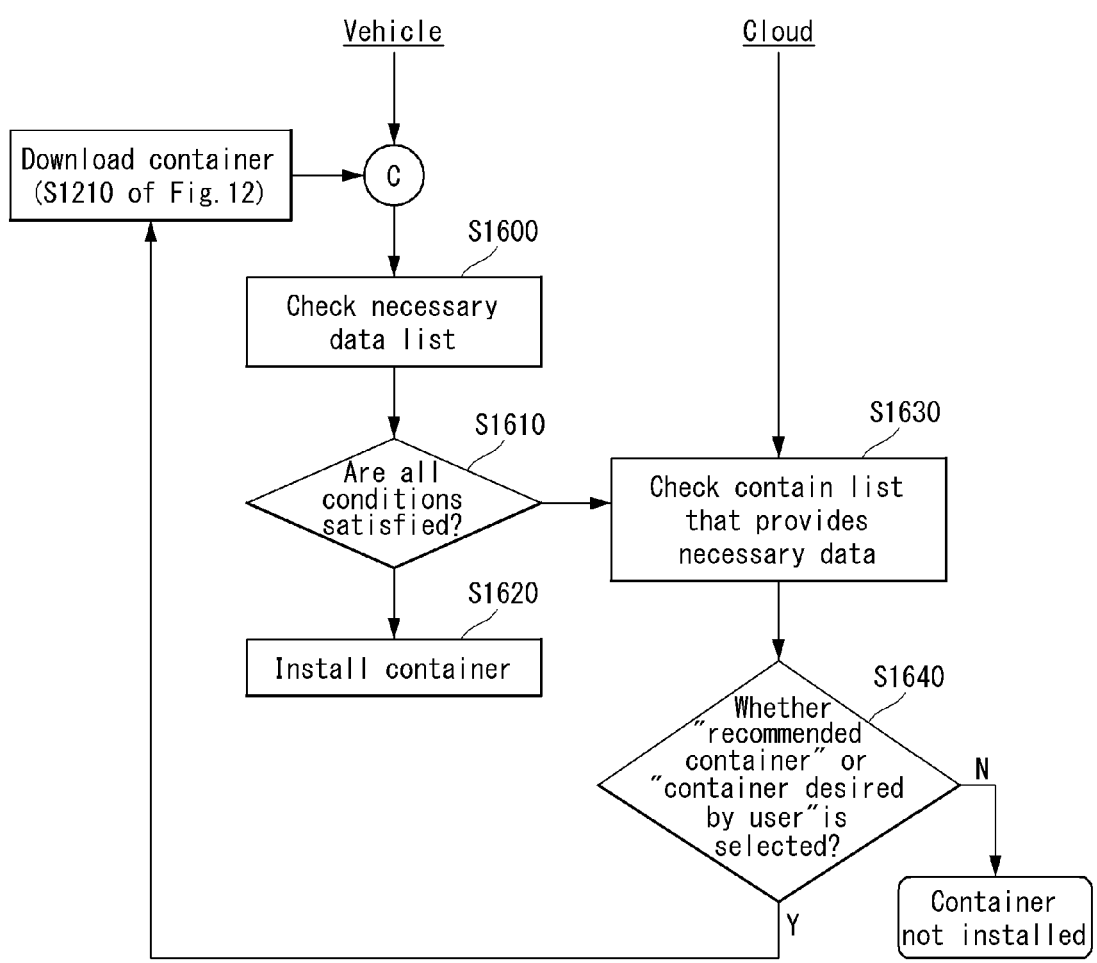
FIG. 16 is a flowchart for describing an operation of performing container dependency check according to an embodiment of the present disclosure.
Figure 17:
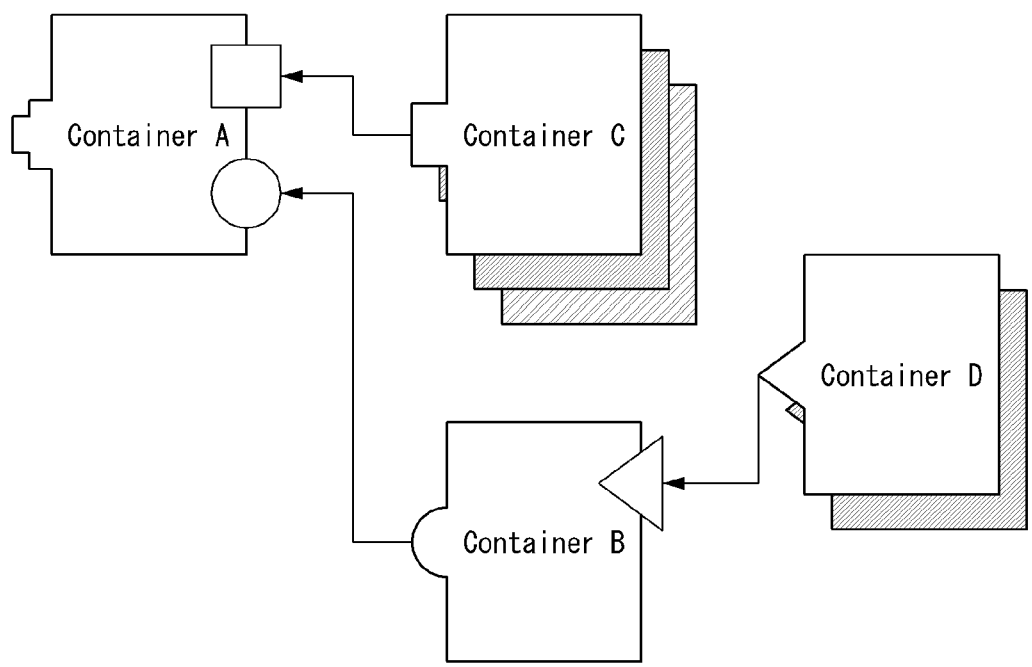
FIG. 17 is a diagram for describing a process of a container package being completed in the container dependency check process.

FIG. 16 is a flowchart for describing an operation of container dependency check being performed according to an embodiment of the present disclosure. FIG. 17 is a diagram for describing of a process of a container package being completed in the container dependency check process.

After a new device is detected, and container information of the new device is received from the cloud and downloaded from a container, container dependency check may be performed. The dependency check may be an operation of determining whether all container packages necessary for container driving have been secured.

The container manager 1030 may generate a necessary data list by checking data necessary for each container, and may search for a container which may be provided. The container manager 1030 may receive the necessary data list by requesting it from the cloud. The container manager 1030 may check whether all conditions necessary for container driving have been satisfied (S1610) by checking the necessary data list (S1600). If it is determined that all container packages have been secured, the container manager 1030 may perform a container installation operation (S1620).

Meanwhile, as a result of the check of the necessary data list, if it is determined that the container package is not a completed package, the container manager 1030 transmits the results of the dependency check to the cloud. The cloud may check a container list that provides necessary data (S1630) and may search for an additional container. Thereafter, the cloud may provide the vehicle with information on which a recommended container or a container desired by a user may be selected. When any one of the recommended container or the container desired by a user is selected in the vehicle, the container manager 1030 may download the selected container.

For example, when an AR-HUD is newly mounted in a situation in which the existing HUD has been installed on a vehicle, the vehicle may have a container for using the existing HUD. As a result of dependency check, the first container of a plurality of containers has passed through the dependency check, but a container recommended in the second container or desired by a user may not be present. In this case, the container may support an AR-HUD operation by satisfying the version of the container through updates or through a replacement or addition process.

If proper container search is not performed in the cloud, the process may be terminated as a container non-installation state because a recommended container item can be provided.

Referring to FIG. 17, assuming that the container of a newly mounted AR-HUD is a container A, the container A may be recognized as a normal container package only when a container B and a container C are additionally connected. If it is determined that the container C is not connected to the container A in a dependency check process, the container manager 1030 searches the container repository of a vehicle or the container repository of the cloud and connects the container C to the container A. Furthermore, if it is determined that the container B is not connected to the container B in the dependency check process, the container manager 1030 may perform control so that the container B is searched for and connected to the container B. Furthermore, the normal execution of the AR-HUD function may be supported only when the additionally connected container B is additionally connected to the container D. In this case, the container manager 1030 may perform control so that the container D is searched for and additionally connected to the container B. Accordingly, in order to actually execute the AR-HUD function normally, whether the container A, the container B, the container C, and the container D have been packaged normally may be checked through dependency check.

Furthermore, if only the container A has been necessary for the execution of the existing BUD, the container manager 1030 may receive container package information necessary for the execution of an AR-HUD by requesting the container package information from the cloud, when the AR-HUD is mounted. If it is determined that a container now present in the system of a vehicle is only the container A, the container manager 1030 may receive the containers B, C, and D by requesting them from the cloud. When the cloud receives a request to check container package information necessary for the container manager 1030 to execute the AR-HUD, the cloud may monitor a current situation of a container now installed on a vehicle system, and may transmit the containers B, C, and D to the vehicle.

Figure 18:
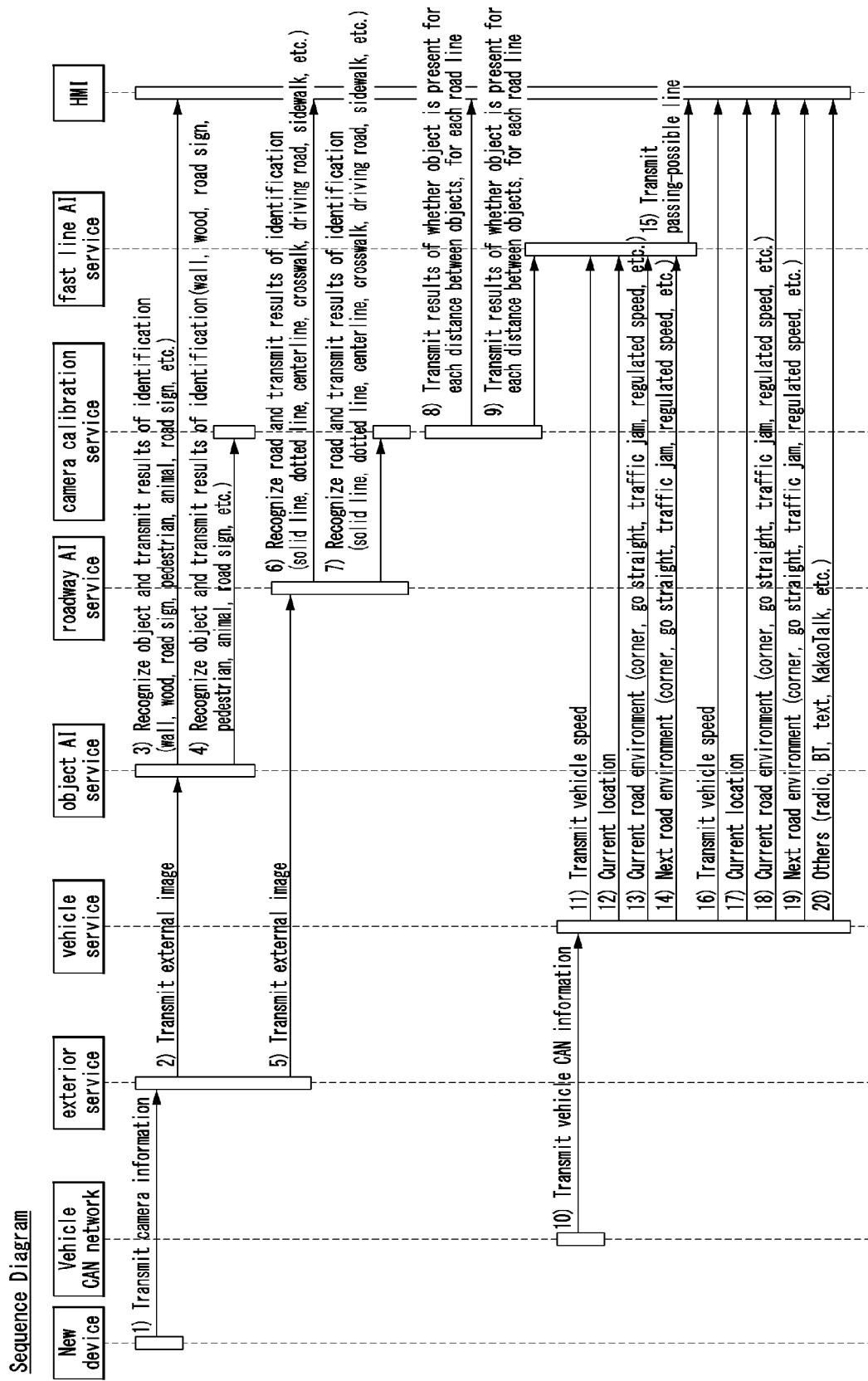
FIG. 18 is a sequence diagram for describing an example in which an AR-HUD container gets vehicle data and performs an AR-HUD function according to an embodiment of the present disclosure.

FIG. 18 is a sequence diagram for describing an example in which an AR-HUD container gets vehicle data and performs an AR-HUD function according to an embodiment of the present disclosure.

In order to perform the AR-HUD function according to an embodiment of the present disclosure normally, the AR-HUD container may use data collected from a vehicle. For example, the data may include the speed, object recognition, and road recognition of the vehicle, a distance from each object, whether an object is present in each road line, location information, a passing-possible line recognition, etc.

Meanwhile, the AR-HUD container newly installed on the vehicle through the aforementioned method may be classified as at least one part for accessing vehicle data and generating AR information using the vehicle data. For example, the AR-HUD container may be configured with a vehicle service part, an exterior service part, an object AI service part, a roadway AI service part, a camera calibration service part, and a fast line AI service part. The container manager 1030 opens a data path between the container and the vehicle sensing data in response to a permission request from the AR-HUD container. Accordingly, each part of the container may access the vehicle sensing data stored in the vehicle data repository.

More specifically, the vehicle service part of the AR-HUD container may get a vehicle speed from a vehicle CAN network.

Furthermore, the exterior service part of the AR-HUD container is connected to a new device (camera) and may get an external image. The object AI service part may get an external image through the exterior service part. The object AI service part may perform an inference operation for recognizing a front object based on the aforementioned acquisition information. The AR-HUD may identify that the type of object is a vehicle, a wall, a wood, a road sign, a pedestrian, or an animal as a result of the inference based on the image information obtained by the vehicle.

Furthermore, the exterior service part of the AR-HUD container is connected to a new device (camera) and may get an external image. The roadway AI service part of the AR-HUD container may get an external image of the exterior service part. The roadway AI service part may perform an inference operation for road recognition and a classification operation. The AR-HUD may identify that the type of object is a solid line, a dotted line, a centerline, a crosswalk, a driving road, or a sidewalk as a result of the inference based on the image information obtained by the vehicle.

Furthermore, the camera calibration service part of the AR-HUD container may get a relationship between a camera pixel coordinate system and a real coordinate system. The camera calibration service part may convert a location based on the coordinate relationship based on the real coordinate system.

Furthermore, the vehicle service of the AR-HUD container may get a current location, current and next road environments, and destination location of a vehicle from a vehicle CAN network.

Furthermore, the fast line AI service part of the AR-HUD container may get the aforementioned vehicle speed, distance between objects, whether an object is present in each road line, current location, current road environment, and next road environment information. The fact line AI service part of the AR-HUD container may infer a passing-possible line based on the above information.

A process of performing, by the AR-HUD container, the AR-HUD function using vehicle data is more specifically described with reference to the sequence diagram of FIG. 18.

The front camera (new device) transmits camera information to the exterior service part. The exterior service part transmits an external image to each of the object AI service part and the roadway AI service part.

The object AI service part and the roadway AI service part may recognize and identify an object from an image through AI processing, and may transmit the object to the camera calibration service part and the HMI.

The camera calibration service part may determine a distance between objects and the results of whether an object is present in each road line, and may transmit them to the HMI.

Meanwhile, the vehicle network (e.g., CAN network) may transmit CAN data of the vehicle to the vehicle service part. The vehicle service part may transmit, to the fast line AI service part, the speed, location and current road environment of the vehicle, and a current location, current road environment, and next road environment of the vehicle from the CAN data. The fast line AI service part may combine the received data and transmit the combined data to the passing-possible line. Furthermore, the vehicle service part may transmit, to the HMI, the speed, current location, current road environment, next road environment, and situation in which media are used, of the vehicle.

Figure 19:
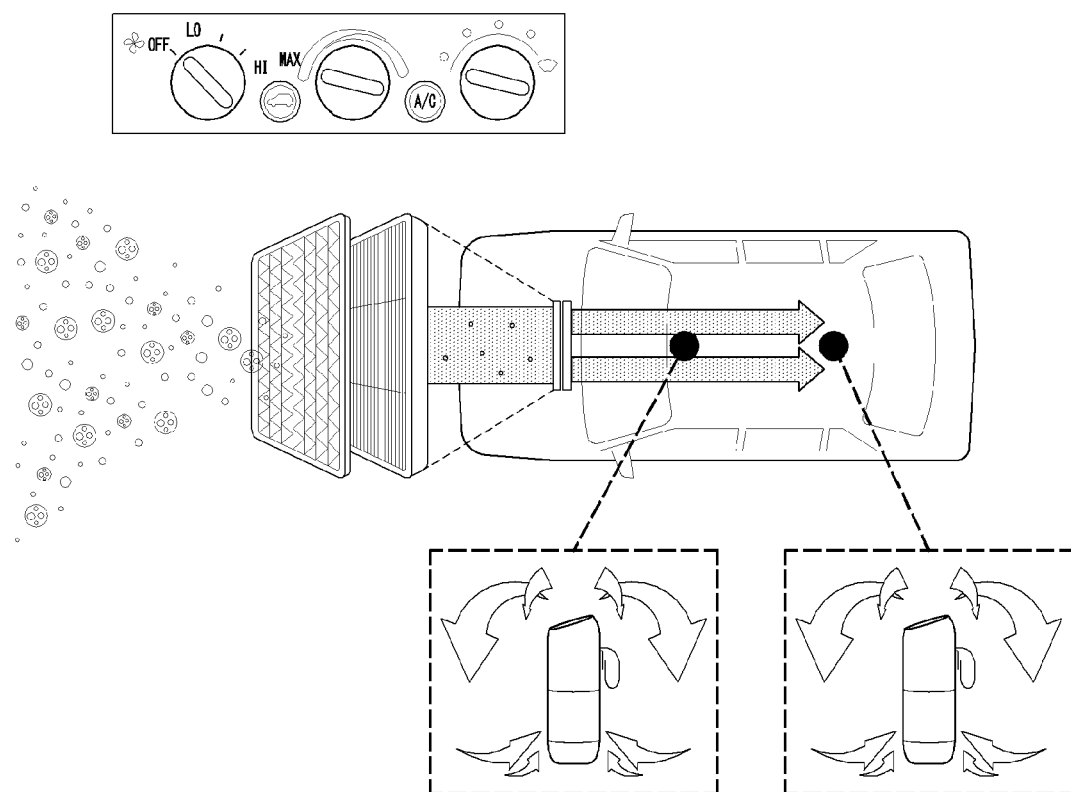
FIGS. 19 and 20 are diagrams for describing a process of a new container being installed when a new device is mounted according to an embodiment of the present disclosure.
Figure 20:
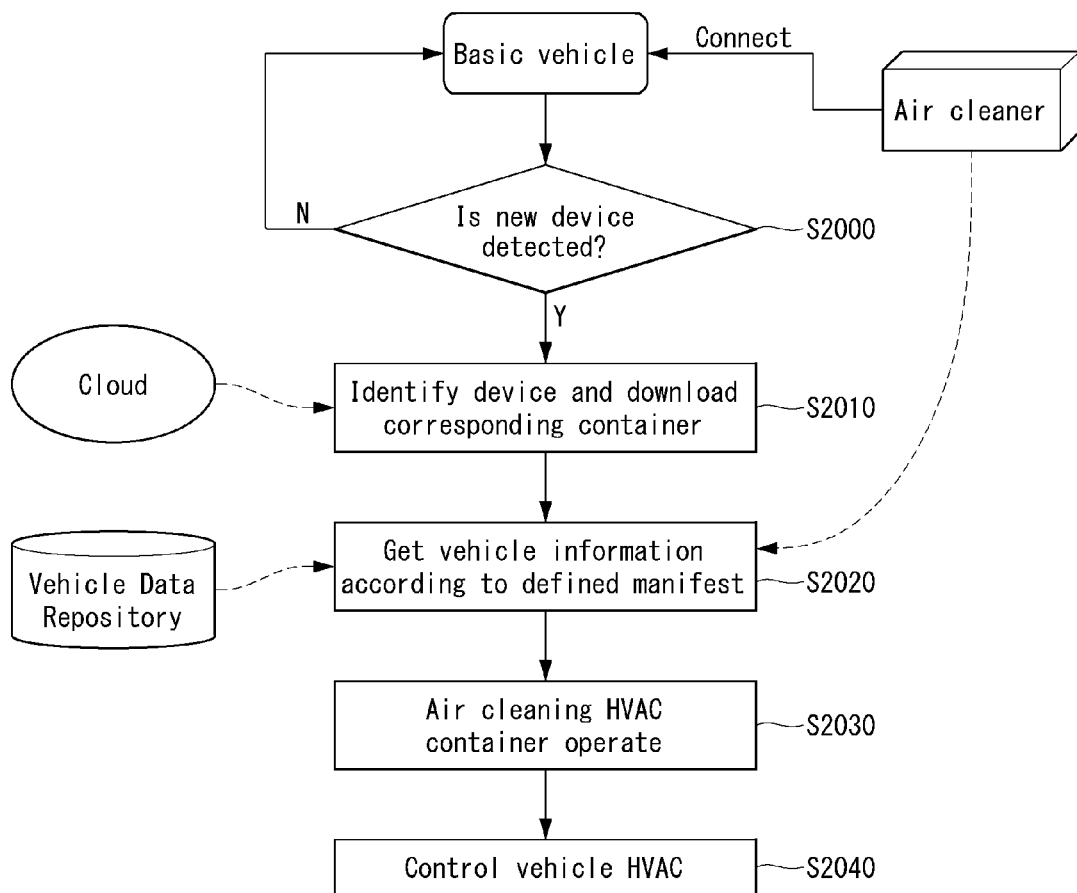

FIGS. 19 and 20 are diagrams for describing a process of a new container being installed when a new device is mounted according to an embodiment of the present disclosure.

Referring to FIG. 19, in the state in which an air cleaner is not present in a vehicle, if the vehicle does not store an air cleaner container and at least one air cleaner is mounted in the vehicle in this state, a new container for controlling an air cleaner operation is necessary.

Referring to FIG. 20, when an air cleaner is connected to a vehicle, the vehicle detects the air cleaner (S2000). The vehicle transmits, to the server, information which may be provided by the vehicle and information provided by the air cleaner. The server may comprise a cloud server, a network server and all other types of servers.

The server may download a container corresponding to the information received from the vehicle (S2010).

The container manager gets vehicle information according to a defined manifest (S2020). The vehicle may get, from the vehicle data repository, at least one vehicle sensing data collected through a vehicle network manager. Furthermore, the container manager may get air cleaner information from the air cleaner. The air cleaner information may include information related to a FAN speed, a PM 10-fine dust numerical value, a PM 2.5-fine dust numerical value, a carbon dioxide concentration, and a degree of filter contamination.

The container manager controls the air cleaner container to operate by installing the downloaded container, thus controlling the air cleaner of the vehicle (S2030 and S2040).

The vehicle has the air cleaner container installed thereon, and may connect HVAC information provided by the vehicle based on a manifest definition. Accordingly, when a fine dust numerical value is high, the vehicle may automatically close a window and maintain an air-conditioning state to an internal air state. Furthermore, when a fine dust numerical value is low, the vehicle may adjust the FAN speed. When a carbon dioxide concentration is high, the vehicle may control the air cleaner to operate in an external air mode. Furthermore, if there is no change in the concentration after a given time in the external air mode, the vehicle may control the window to be open. The vehicle may recognize that there is a difference in the fine dust numerical value for each location of the air cleaner, and may adjust the wind intensity and wind direction of the air cleaner.

In the present disclosure, the AR-HUD and the air cleaner have been described as examples of the new device, but the present disclosure is not limited thereto. For example, if a new device mounted in a vehicle is a high-performance DMS, the container of a conventional DMS may be updated. That is, in this case, unlike in the aforementioned example of the air cleaner, a new container is not downloaded and installed, but the container may be updated in such a way to add a container capable of executing a high-performance DMS function in the existing installed DMS container.

Accordingly, the vehicle may determine that a container update is necessary as the high-performance DMS is identified, may get vehicle sensing data from the vehicle data repository, and may get high-performance DMS information from the high-performance DMS. In this case, the high-performance DMS information may include doziness information of a driver, the tracking of an eye of the driver, a head direction (roll, yaw, pitch) of the driver, a movement of the lips of the driver, and expression/emotion/face recognition information of the driver. Furthermore, the vehicle sensing data may include the speed, audio alert, HVAC, ADAS information, voice recognition, etc. of the vehicle.

Accordingly, the vehicle may determine whether a visual field of the driver is matched based on dangerous object information received from an ADAS, and may control the visual field of the driver to be induced to the dangerous object. Furthermore, in order to improve the accuracy of a voice command of the driver, the vehicle may determine a movement of the lips of the driver. Furthermore, the vehicle may adjust a temperature and ventilation, etc. within the vehicle by inferring the driver's emotion.

The aforementioned disclosure may be implemented as a computer-readable code in a medium in which a program is written. The computer-readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, magnetic tapes, floppy disks, and optical data storages, and also include that the computer-readable medium is implemented in the form of carrier waves (e.g., transmission through the Internet). Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A method of activating a new device in a vehicle based on a container, the method comprising:
   detecting the new device mounted in the vehicle using an interface implemented in the vehicle;
   identifying the detected new device;
   transmitting, to a cloud server, (i) a request for a container for controlling an execution of the identified new device and (ii) information obtained by one or more sensors implemented in the vehicle;
   receiving, from the cloud server, a container package including at least one container that is retrieved in the cloud server in response to the request for the container; and
   controlling the execution of the new device by activating the at least one container,
   wherein identifying the detected new device includes:
      determining whether the detected new device is present in at least one of a vehicle device repository or the cloud server; and
      determining the new device as a non-supported device based on the new device being determined to be not present in at least one of the vehicle device repository or the cloud server, and
   based on the new device being determined as the non-supported device:
      transmitting information of the new device and identification error information to the cloud server; and
      identifying the new device based on the new device being registered in the cloud server.

2. The method of claim 1,
wherein the information is related to the new device.

3. The method of claim 2,
wherein the information includes at least one vehicle sensing data, the vehicle sensing data stored in a vehicle repository and collected over at least one vehicle network configured to receive at least one vehicle sensing data from the one or more sensors.

4. The method of claim 2,
wherein the information of the new device includes at least one functional information provided from the new device to the vehicle.

5. The method of claim 1,
wherein receiving the container package further includes:
   receiving, from the cloud server, information of at least one container corresponding to the new device in response to the request;
   determining whether the at least one container included in the received information is operable in a system of the vehicle; and
   displaying the at least one operable container on a display of the vehicle.

6. The method of claim 5, further including:
   downloading a selected container from the cloud server based on the at least one operable container being selected;
   performing dependency check on the downloaded container; and
   installing the downloaded container based on the dependency check being satisfied.

7. The method of claim 6,
wherein the dependency check includes:
   determining whether an omission of at least one container that is essential for the execution of the new device is present in the container package; and
   receiving a complete container package from the cloud server by transmitting a request to the cloud server based on the omission being present.

8. The method of claim 5, further including:
   updating, based on the at least one operable container not being selected, a list of containers based on a version update of a container previously installed on the vehicle, a replacement of the previously installed container, or an addition of new part to the previously installed container.

9. A method of activating a new device in a vehicle based on a container, the method comprising:
   detecting the new device mounted in the vehicle using an interface implemented in the vehicle;
   identifying the detected new device;
   transmitting, to a cloud server, (i) a request for a container for controlling an execution of the identified new device and (ii) information obtained by one or more sensors implemented in the vehicle;
   receiving, from the cloud server, a container package including at least one container that is retrieved in the cloud server in response to the request for the container; and
   controlling the execution of the new device by activating the at least one container,
   wherein the information is related to the new device,
   wherein the new device is an augmented reality head-up display (AR-HUD), and
   wherein the information of the new device includes at least one of a speed, object recognition and identification function, and road recognition and identification function of the vehicle, a distance between objects, a presence of an object in each road line, a current location of the vehicle, current and next road environments, a destination, or a passing-possible line.

10. A method of activating a new device in a vehicle based on a container, the method comprising:
   detecting the new device mounted in the vehicle using an interface implemented in the vehicle;
   identifying the detected new device;
   transmitting, to a cloud server, (i) a request for a container for controlling an execution of the identified new device and (ii) information obtained by one or more sensors implemented in the vehicle;
   receiving, from the cloud server, a container package including at least one container that is retrieved in the cloud server in response to the request for the container; and
   controlling the execution of the new device by activating the at least one container,
   wherein the information is related to the new device,
   wherein the new device is an air cleaner, and
   wherein the information of the new device includes at least one of a fan speed of the air cleaner, particulate matter (PM) 10 fine dust concentrations, PM 2.5 fine dust concentrations, a carbon dioxide concentration, or a degree of filter contamination.

11. A method of activating a new device in a vehicle based on a container, the method comprising:
   detecting the new device mounted in the vehicle using an interface implemented in the vehicle;
   identifying the detected new device;
   transmitting, to a cloud server, (i) a request for a container for controlling an execution of the identified new device and (ii) information obtained by one or more sensors implemented in the vehicle;

receiving, from the cloud server, a container package including at least one container that is retrieved in the cloud server in response to the request for the container; and controlling the execution of the new device by activating the at least one container, wherein the information is related to the new device, wherein the new device is a driver monitoring system (DMS), and wherein the information of the new device includes a function for detecting at least sleepiness information, eye tracking, a head direction, a movement of lips, an expression, an emotion, or face recognition of a driver.

12. A vehicle system comprising:

an interface configured to detect a connection to a device from a vehicle;

a vehicle data repository configured to obtain at least one vehicle sensing data;

a container repository configured to store a container including at least one program, data and system library for controlling an execution of an external device; and a processor functionally coupled to the vehicle data repository and the container repository and configured to control an execution of the container, wherein the processor is further configured to:
  identify a detected new device based on a connection to the new device being detected through the interface,
  transmit, to a cloud server, (i) a request for a container for controlling an execution of the identified new device and (ii) the at least one vehicle sensing data obtained by one or more sensors implemented in the vehicle,
  receive, from the cloud server, a container package including at least one container that is retrieved in the cloud server in response to the request for the container, and
  control the execution of the new device by activating the at least one container, wherein identify the detected new device includes:
    determine whether the detected new device is present in at least one of a vehicle device repository or the cloud server; and
    determine the new device as a non-supported device based on the new device being determined to be not present in at least one of the vehicle device repository or the cloud server, and based on the new device being determined as the non-supported device:
  transmit information of the new device and identification error information to the cloud server; and
  identify the new device based on the new device being registered in the cloud server.

13. The vehicle system of claim 12, wherein the processor is configured to transmit the request based on information provided by the vehicle and related to the new device.

14. The vehicle system of claim 13, wherein the information includes the at least one vehicle sensing data collected over at least one vehicle network configured to receive at least one vehicle sensing data from the one or more sensors.

15. The vehicle system of claim 13, wherein the information of the new device includes at least one functional information provided from the new device to the vehicle.

16. The vehicle system of claim 12, wherein receive the container package includes:
  receive, from the cloud server, information of at least one container corresponding to the new device in response to the request;
  determine whether the at least one container included in the received information is operable in a system of the vehicle; and
  display the at least one operable container on a display of the vehicle.

17. The vehicle system of claim 16, wherein the processor is configured to:
  download a selected container from the cloud server based on the at least one operable container being selected;
  perform dependency check on the downloaded container; and
  install the downloaded container based on the dependency check being satisfied.

18. The vehicle system of claim 17, wherein perform the dependency check includes:
  determine whether an omission of at least one container that is essential for the execution of the new device is present in the container package, and
  receive a complete container package from the cloud server by transmitting a request to the cloud server based on the omission being present.

* * * * *